United States Patent
Nigam et al.

(10) Patent No.: US 10,419,165 B2
(45) Date of Patent: Sep. 17, 2019

(54) METHODS FOR PERFORMING HYBRID REPEAT REQUEST (HARQ) IN CELLULAR OPERATIONS OVER UNLICENSED BANDS

(71) Applicant: Samsung Electronics Co., Ltd., Gyeonggi-do (KR)

(72) Inventors: Anshuman Nigam, Bangalore (IN); Anil Agiwal, Bangalore (IN); Nagacharan Udupi, Bangalore (IN); Ashok Kumar Reddy Chavva, Bangalore (IN); Diwakar Sharma, Bangalore (IN); Jung-Soo Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 160 days.

(21) Appl. No.: 15/524,964

(22) PCT Filed: Nov. 9, 2015

(86) PCT No.: PCT/KR2015/012007
§ 371 (c)(1),
(2) Date: May 5, 2017

(87) PCT Pub. No.: WO2016/072820
PCT Pub. Date: May 12, 2016

(65) Prior Publication Data
US 2017/0338912 A1    Nov. 23, 2017

(30) Foreign Application Priority Data

Nov. 7, 2014  (IN) ........................... 5629/CHE/2014
Nov. 4, 2015  (IN) ........................... 5629/CHE/2014

(51) Int. Cl.
*H04L 1/00*    (2006.01)
*H04L 1/18*    (2006.01)
(Continued)

(52) U.S. Cl.
CPC ............ *H04L 1/1812* (2013.01); *H04L 1/189* (2013.01); *H04L 1/1819* (2013.01);
(Continued)

(58) Field of Classification Search
CPC ....... H04L 1/18; H04L 1/1812; H04L 1/1819; H04L 61/3095; H04W 72/0406
See application file for complete search history.

(56) References Cited

U.S. PATENT DOCUMENTS 8,559,383 B2 * 10/2013 Zetterman ......... H04W 72/1215
                                                         370/310
9,059,845 B2 *  6/2015 Dalsgaard ............. H04L 1/1812
(Continued)

OTHER PUBLICATIONS

International Search Report dated Mar. 31, 2016 in connection with International Patent Application No. PCT/KR2015/012007.
(Continued)

*Primary Examiner* — Esaw T Abraham

(57) ABSTRACT

The various embodiments of the present invention disclose a method and system for performing Hybrid Repeat Request (HARQ) in cellular operations over unlicensed bands. The method comprises of checking, by an eNodeB (eNB), whether an unlicensed channel is occupied by a User Equipment (UE), initiating transmission of Redundancy Versions (RVs) corresponding to a HARQ process on the unlicensed channel if the unlicensed channel is occupied by the UE, verifying if a channel occupancy period is over and an acknowledgement for the HARQ process is received from the unlicensed channel and initiating a Redundancy Version (RV) bundling for retransmission of the bundled RVs without awaiting an acknowledgment for the HARQ process from the unlicensed channel, if the channel occupancy period is not over.

22 Claims, 20 Drawing Sheets

(51) Int. Cl.
*H04W 72/04* (2009.01)
*H04W 76/27* (2018.01)
*H04L 29/12* (2006.01)

(52) U.S. Cl.
CPC ..... *H04W 72/0406* (2013.01); *H04L 61/3095* (2013.01); *H04W 76/27* (2018.02)

(56) References Cited

U.S. PATENT DOCUMENTS

| | | | |
|---|---|---|---|
| 9,237,584 B2 * | 1/2016 | Hong | H04W 72/1215 |
| 9,413,500 B2 * | 8/2016 | Chincholi | H04L 5/001 |
| 9,578,625 B2 * | 2/2017 | Seo | H04W 72/0453 |
| 9,674,825 B2 * | 6/2017 | Yerramalli | H04W 74/002 |
| 9,693,264 B2 * | 6/2017 | Kim | H04W 16/14 |
| 9,743,432 B2 * | 8/2017 | Ji | H04J 3/16 |
| 9,844,057 B2 * | 12/2017 | Gaal | H04W 72/0453 |
| 9,854,446 B2 * | 12/2017 | Kim | H04W 16/14 |
| 9,860,027 B2 * | 1/2018 | Christoffersson | H04L 1/1887 |
| 9,924,368 B2 * | 3/2018 | Valliappan | H04W 16/14 |
| 2013/0201884 A1 | 8/2013 | Freda et al. | |
| 2013/0242889 A1 | 9/2013 | Khoryaev et al. | |
| 2013/0250869 A1 | 9/2013 | Eriksson | |
| 2014/0040694 A1 | 2/2014 | Verma et al. | |

OTHER PUBLICATIONS

"Considerartions on LBT Enhancements for Licensed-Assisted Access", Alcatel-Lucent Shanghai Bell, 3GPP TSG RAN WG1 Meeting #78bis, Aug. 6-10, 2014, 6 pages, R1-144083.

* cited by examiner

300

| Unlicensed | Channel Occupancy | 10 ms | | | | | | | | | |
|---|---|---|---|---|---|---|---|---|---|---|---|
| | Subframe Number | 0 | 1 | 2 | 3 | 4 | 5 | 6 | 7 | 8 | 9 |
| | HARQ Proc ID | x | x | x | x | y | y | y | y | z | z |
| | Redundancy Version | 0 | 2 | 3 | 1 | 0 | 2 | 3 | 1 | 0 | 3 |

Bundling Indication

| Unlicensed | Channel Occupancy | 10 ms | | | | | | | | | |
|---|---|---|---|---|---|---|---|---|---|---|---|
| | Subframe Number | 0 | 1 | 2 | 3 | 4 | 5 | 6 | 7 | 8 | 9 |
| | HARQ Proc ID | x | y | z | w | p | y | y | x | z | z |
| | Redundancy Version | 0 | 2 | 3 | 1 | 0 | 2 | 3 | 1 | 0 | 3 |

Bundling Indication

| Unlicensed | Channel Occupancy | 10 ms | | | | | | | | | |
|---|---|---|---|---|---|---|---|---|---|---|---|
| | Subframe Number | 0 | 1 | 2 | 3 | 4 | 5 | 6 | 7 | 8 | 9 |
| | HARQ Proc ID | x | y | z | w | p | q | r | x | x | x |
| | Redundancy Version | 0 | 2 | 3 | 1 | 0 | 2 | 3 | 1 | 0 | 3 |

PDCCH Carries Bundling Indication (per process) For X, Y, Z

| Unlicensed | Channel Occupancy | 10 ms | | | | | | | | | |
|---|---|---|---|---|---|---|---|---|---|---|---|
| | Subframe Number | 0 | 1 | 2 | 3 | 4 | 5 | 6 | 7 | 8 | 9 |
| | HARQ Proc ID | x | y | z | w | p | y | y | x | z | z |
| | Redundancy Version | 0 | 2 | 3 | 1 | 0 | 2 | 3 | 1 | 0 | 3 |

FIG.6

Bundling Indication
Start Time: After 1st Tx

700

| Unlicensed | Channel Occupancy | 10 ms | | | | | | | | | |
|---|---|---|---|---|---|---|---|---|---|---|---|
| | Subframe Number | 0 | 1 | 2 | 3 | 4 | 5 | 6 | 7 | 8 | 9 |
| | HARQ Proc ID | x | x | x | x | y | y | y | y | z | z |
| | Redundancy Version | 0 | 2 | 3 | 1 | 0 | 2 | 3 | 1 | 0 | 3 |

FIG.7

Bundling Indication
Start Time: After last
regular transmission

800

| Unlicensed | Channel Occupancy | 10 ms | | | | | | | | | |
|---|---|---|---|---|---|---|---|---|---|---|---|
| | Subframe Number | 0 | 1 | 2 | 3 | 4 | 5 | 6 | 7 | 8 | 9 |
| | HARQ Proc ID | x | y | z | w | p | q | r | x | x | x |
| | Redundancy Version | 0 | 2 | 3 | 1 | 0 | 2 | 3 | 1 | 0 | 3 |

FIG.8

Bundling Indication
Process:Subframes → X:6, Y:5,7, Z:8,9

| Unlicensed | Channel Occupancy | 10 ms | | | | | | | | | |
|---|---|---|---|---|---|---|---|---|---|---|---|
| | Subframe Number | 0 | 1 | 2 | 3 | 4 | 5 | 6 | 7 | 8 | 9 |
| | HARQ Proc ID | x | y | z | w | p | y | x | y | z | z |
| | Redundancy Version | 0 | 2 | 3 | 1 | 0 | 2 | 3 | 1 | 0 | 3 |

FIG.9

| Unlicensed | Channel Occupancy | 10 ms | | | | | | | | | |
|---|---|---|---|---|---|---|---|---|---|---|---|
| | Subframe Number | 0 | 1 | 2 | 3 | 4 | 5 | 6 | 7 | 8 | 9 |
| | HARQ Proc ID | x | y | z | w | p | q | r | x | x | x |
| | Redundancy Version | 0 | 2 | 3 | 1 | 0 | 2 | 3 | 1 | 0 | 3 |

FIG.10

| Carrier 1 (Unlicensed Carrier) | | | | | | | | | | |
|---|---|---|---|---|---|---|---|---|---|---|
| Channel Occupancy | 10 ms | | | | | | | | | |
| Subframe Number | 0 | 1 | 2 | 3 | 4 | 5 | 6 | 7 | 8 | 9 |
| HARQ Proc ID | x | y | z | k | m | x | y | z | k | m |
| Redundancy Version | 0 | 0 | 0 | 0 | 0 | 2 | 2 | 2 | 2 | 2 |
| Carrier 2 (Unlicensed Carrier) | | | | | | | | | | |
| Channel Occupancy | 10 ms | | | | | | | | | |
| Subframe Number | 0 | 1 | 2 | 3 | 4 | 5 | 6 | 7 | 8 | 9 |
| HARQ Proc ID | | | | | m | x | y | z | k | m |
| Redundancy Version | | | | | 1 | 3 | 3 | 3 | 3 | 3 |
| Primary Component Carrier | | | | | | | | | | |
| Channel Occupancy | 10 ms | | | | | | | | | |
| Subframe Number | | | | | x! | y! | z! | k! | m! | x! |
| HARQ Proc ID | x | y | z | k | | | | | | |
| Redundancy Version | | | | | x(1) | | y(1) | | | |

FIG.19

| Multi-carrier HARQ Indication → 2000 | | | | | | | | | | | |
|---|---|---|---|---|---|---|---|---|---|---|---|
| Carrier 1 (Unlicensed Carrier) | | | | | | | | | | | |
| Channel Occupancy | 10 ms | | | | | | | | | | |
| Subframe Number | | 0 | 1 | 2 | 3 | 4 | 5 | 6 | 7 | 8 | 9 |
| HARQ Proc ID | | x | y | z | k | m | x | y | z | k | m |
| Redundancy Version | | 0 | 0 | 0 | 0 | 0 | 2 | 2 | 2 | 2 | 2 |
| Carrier 2 (Unlicensed Carrier) | | | | | | | | | | | |
| Channel Occupancy | 10 ms | | | | | | | | | | |
| Subframe Number | | 0 | 1 | 2 | 3 | 4 | 5 | 6 | 7 | 8 | 9 |
| HARQ Proc ID | | | | | | m | x | y | z | k | m |
| Redundancy Version | | | | | | 1 | 3 | 3 | 3 | 3 | 3 |
| Primary Component Carrier | | | | | | | | | | | |
| Channel Occupancy | 10 ms | | | | | | | | | | |
| Subframe Number | | | | | | x! | y! | z! | k! | m! | x! |
| HARQ Proc ID | | X | Y | Z | K | | | | | | |
| Redundancy Version | | | | | | | x(1) | | y(1) | | |

FIG.20

Mulit-carrier HARQ Indication
Carriers for Multicarrier HARQ: Unlicensed Carrier2

2100

| Carrier 1 (Unlicensed Carrier) | | | | | | | | | | |
|---|---|---|---|---|---|---|---|---|---|---|
| Channel Occupancy | 10 ms | | | | | | | | | |
| Subframe Number | 0 | 1 | 2 | 3 | 4 | 5 | 6 | 7 | 8 | 9 |
| HARQ Proc ID | x | y | z | k | m | x | y | z | k | m |
| Redundancy Version | 0 | 0 | 0 | 0 | 0 | 2 | 2 | 2 | 2 | 2 |
| Carrier 2 (Unlicensed Carrier) | | | | | | | | | | |
| Channel Occupancy | 10 ms | | | | | | | | | |
| Subframe Number | 0 | 1 | 2 | 3 | 4 | 5 | 6 | 7 | 8 | 9 |
| HARQ Proc ID | | | | | m | x | y | z | k | m |
| Redundancy Version | | | | | 1 | 3 | 3 | 3 | 3 | 3 |
| Primary Component Carrier | | | | | | | | | | |
| Channel Occupancy | 10 ms | | | | | | | | | |
| Subframe Number | | | | | x! | y! | z! | k! | m! | x! |
| HARQ Proc ID | X | Y | Z | K | | | | | | |
| Redundancy Version | | | | | x(1) | | y(1) | | | |
| Carrier 3 (Unlicensed Carrier) | | | | | | | | | | |
| Channel Occupancy | | | | | | | | | | |
| Subframe Number | | | | | | | | | | |
| HARQ Proc ID | | | | | | | | | | |
| Redundancy Version | | | | | | | | | | |

FIG.21

METHODS FOR PERFORMING HYBRID REPEAT REQUEST (HARQ) IN CELLULAR OPERATIONS OVER UNLICENSED BANDS

CROSS REFERENCE TO RELATED APPLICATIONS

This application is a National Phase Entry of PCT International Application No. PCT/KR2015/012007, which was filed on Nov. 9, 2015, and claims priority to Indian Patent Application No. 5629/CHE/2014, which was filed in the Indian Intellectual Property Office on Nov. 7, 2014, and Indian Patent Application No. 5629/CHE/2014, which was filed in the Indian Intellectual Property Office on Nov. 4, 2015, the entire content of each of which is incorporated by reference.

TECHNICAL FIELD

The present invention generally relates to wireless networks and, more specifically, relates to use of unlicensed bands by the wireless network. The present invention more particularly relates to a licensed assisted operation of cellular communications in unlicensed spectrum.

BACKGROUND

The cellular industry which was until now unassumingly built on the basic premise of operating over licensed spectrum is considering the usage of operation on unlicensed band in order to meet the surging traffic demands. The unlicensed bands are typically dominated by Wi-Fi and other technologies. 3GPP has already decided to customize LTE standards in the LTE Release 13 for operation on the unlicensed bands and to exist harmoniously with Wi-Fi and other technologies. Unlicensed band is free to be used by any technology but is governed by few regulations (in most countries) like the requirement of "Listen Before Talk—LBT" which requires a transmitter to sense the channel for at least 20 us and if the channel is found to be free (not used by other devices) then it is allowed to transmit. Further the regulations allow for transmissions up to a maximum time limit and also provide means for giving fairness to the other devices/technologies.

In the legacy 3GPP LTE system, the concept of carrier aggregation is used in which multiple carriers can be allocated to a multi-carrier capable UE in order to boost the data rates, as depicted in FIG. 1. FIG. 1 is a schematic diagram 100 illustrating allocation of multiple carriers to the UE, according to the existing art. According to FIG. 1, one carrier is referred to as the Primary carrier 102 and the other carriers are referred to as the secondary carriers carrier1 104 and carrier2 106. The sub-frame boundaries on all the carriers are considered to be aligned. The scheduling can be self-carrier based or cross carrier based. In the self-carrier mode, the PDCCH for a secondary carrier is sent on the secondary carrier itself while in cross carrier mode, the resource allocation for all the secondary carriers is contained in the PDCCH that is sent on the primary carrier only.

FIG. 2 is a schematic block diagram 200 illustrating the processing of the receiving data packet and also preparing of the corresponding HARQ ACK/NACK, according to the prior art illustration. The HARQ operation is performed per carrier, wherein considering the DL scenario, the PDCCH can be sent either on the PCell (Cross Carrier Scheduling) or on the corresponding SCell (Self Scheduling). The HARQ acknowledgement is sent on the PUCCH which till Release 12 of LTE is carried on the PCell. The HARQ processes are defined per carrier and the DL HARQ operation is asynchronous in time which implies that the re-transmission (after receiving the negative acknowledgement NACK) can be sent by the eNB in any sub-frame after minimum time duration referred to as RTT (Re-Transmission Time). This aids in the flexibility of the eNB scheduler. The HARQ acknowledgement (ACK/NACK) is always sent after a pre-specified number of subframes with respect to the sub-frame in which data packet was received. In LTE, the pre-specified value is 3 subframes. This time accounts for the processing of the receiving data packet to determine if it is decoded correctly or not and also includes the time to prepare the corresponding HARQ ACK/NACK.

Further it is to be noted that the HARQ scheme in LTE is based on the incremental redundancy HARQ protocol in which a number of redundancy versions packets are created the original encoded data packet that is to be transmitted. A redundancy version packet is transmitted as the first transmission and if the UE sends a NACK then a next redundancy version packet is transmitted. The UE then attempts to decode the packet by combining both the redundancy version received at the first transmission and the redundancy version packet received at the first re-transmission. If the decoding is a success then the UE sends a ACK and the HARQ process completes else the UE sends a NACK and the eNB transmits another redundancy version packet to the UE. The UE then attempts to decode the packet by combining the first transmission, the first and the second re-transmission redundancy version packets received. Then it sends ACK/NACK subsequently. This process is repeated until the UE sends the ACK or until all the redundancy version packets are transmitted. In LTE 4 redundancy version (RV) packets are defined. The sequence of transmission is also pre-specified to be RV0, RV2, RV3 and RV1.

3GPP has started to work on utilizing the unlicensed bands for cellular communication. It has been agreed to add an unlicensed carrier in the legacy carrier aggregation framework of LTE. The unlicensed carrier is assumed to work in a license assisted manner. The standalone usage of unlicensed carrier is not conceived for the initial phases. This system is further referred to as LTE-U.

DISCLOSURE

Technical Problem

In LTE-U system since the usage of the unlicensed channel is not deterministic in time, the HARQ operation on the unlicensed channel cannot follow a deterministic pattern. In such a system the conventional HARQ operation which involves a retransmission based on the acknowledgement received from the receiver wherein the timings for sending the ACK are pre-configured with respect to the reception of the data packet poses an issue of waiting for the next opportunity for successfully acquiring the unlicensed channel for sending the retransmission which is not guaranteed. This inadvertently affects the latency of the packet reception besides holding the soft buffers or HARQ buffers at the UE in-deterministically, that leads to overall reduction in the UE throughput as the soft buffers or HARQ buffers could have been used for reception over the licensed channels.

In view of the foregoing, there is a need for methods that describes a flexible HARQ mechanism which considers to some degree the latency requirements of the packets and the flushing of the HARQ buffers of the UE.

The above mentioned shortcomings, disadvantages and problems are addressed herein and which will be understood by reading and studying the following specification.

SUMMARY

The various embodiments of the present invention disclose a method for performing Hybrid Repeat Request (HARQ) in cellular operations over unlicensed bands. According to an embodiment of the present invention, a method for performing Hybrid Repeat Request (HARQ) in cellular operations over unlicensed bands comprises of checking, by an eNodeB (eNB), if an unlicensed channel is occupied by a User Equipment (UE), initiating transmission of Redundancy Versions (RVs) corresponding to a HARQ process on the unlicensed channel if the unlicensed channel is occupied by the UE, verifying if a channel occupancy period is over and an acknowledgement for the HARQ process is received from the unlicensed channel, and initiating a Redundancy Version (RV) bundling for retransmission of bundled RVs without awaiting an acknowledgment for the HARQ process from the unlicensed channel, if the channel occupancy period is not over.

According to an embodiment of the present invention, the eNB initiates RV bundling during at least one of, but not limited to, a first retransmission of the RVs, a last regular transmission of the RVs in the channel occupancy period, and the like. According to another embodiment of the present invention, an indication for RV bundling is configured for the HARQ process by setting an indicator for RV bundling in a Physical Downlink Control Channel (PDCCH), using a MAC message or an RRC message at the UE level and sending a system information message for enabling bundling at a cell level.

According to an embodiment of the present invention, the method further comprises of sending, by the eNB, an RV bundling indication to the UE, wherein the RV bundling indication comprises of a start information of RV bundling, scheduling information of the bundled RVs and a maximum number of bundled RVs.

According to an embodiment of the present invention, the start information of the RV bundling is one of, but not limited to, an absolute time period in units of sub frames, an indication of bundling after the regular retransmission of RVs, and the like.

According to an embodiment of the present invention, the scheduling information of the bundled RVs comprises an indication of the sub frame which includes the bundled RVs, where the bundled RVs are transmitted in consecutive sub-frames following the sub-frame in which the regular RV transmission is sent to the UE or non-consecutive sub-frames. According to another embodiment of the present invention, the maximum number of bundled RV's which is transmitted to the UE is the difference of the total number of RVs and number of RVs previously transmitted in the channel occupancy period. According to another embodiment of the present invention, the method further comprises sending, by the UE, an ACK to the eNB if UE decodes the data packet using the one or more RVs received irrespective of a number of the bundled RVs.

According to an embodiment of the present invention, a method for performing Hybrid Repeat Request (HARQ) in cellular operations over unlicensed bands, comprising steps of checking, by an eNodeB (eNB), if an unlicensed channel is occupied by a User Equipment (UE), initiating transmission of Redundancy Versions (RVs) corresponding to a HARQ process on the unlicensed channel if the unlicensed channel is occupied by the UE, verifying if a channel occupancy period is over and an acknowledgement for the HARQ process is received from the unlicensed channel, suspending the HARQ process if the channel occupancy period is over and an acknowledgement for HARQ process is not received, starting a suspension timer, discarding, by the UE, the processed RVs corresponding to the HARQ process if the suspension timer is expired, and terminating the HARQ process.

According to an embodiment of the present invention, the method further comprises of checking if the unlicensed channel is acquired by the eNB if the suspension timer is not expired, pausing the suspension timer if the unlicensed channel is still occupied, resuming the HARQ process, verifying if a channel occupancy period is over and an acknowledgement for HARQ process is not received from the unlicensed channel, and resuming the suspension timer if the channel occupancy period is over and an acknowledgement for HARQ process is not received from the unlicensed channel.

According to an embodiment of the present invention, the suspension timer is paused when the unlicensed channel is acquired by the eNB. According to another embodiment of the present invention, the suspension timer is resumed when the current channel occupancy period ends and if the sum of the suspension timer running duration and the current channel occupancy period is within a pre-configured value of the suspension timer. According to another embodiment of the present invention, the UE retains the RVs corresponding to the HARQ process in an HARQ buffer until the expiry of the suspension timer.

According to an embodiment of the present invention, the eNB configures the suspension timer value based on, but not limited to, a channel occupancy rate of the unlicensed channel, a traffic requirements for the UE on a licensed channel, a Quality of Service (QoS) of the traffic served on the unlicensed channel, and a combination of the one or more of the traffic requirements on the licensed channel, QoS of the traffic on the unlicensed channel and the channel occupancy rate. According to another embodiment of the present invention, the method further comprises discarding, by the eNB, one or more RVs stored in the HARQ buffers for the corresponding HARQ process if the suspension timer is expired.

According to an embodiment of the present invention, the method further comprises discarding, by the eNB, one or more RVs stored in the HARQ buffers for the corresponding HARQ process if the suspension timer is expired, retaining the MAC PDU corresponding to the suspended HARQ process, and initiating another HARQ process for the retained MAC PDU on the unlicensed channel. According to another embodiment of the present invention, the method further comprises retaining, by the eNB, the MAC PDU and the HARQ buffers corresponding to the suspended HARQ process, continuing transmission of the remaining RVs for the HARQ process on the unlicensed channel or licensed channel.

In another embodiment herein, the method for performing Hybrid Repeat Request (HARQ) in cellular operations over unlicensed bands comprises of checking, by an eNodeB (eNB), if an unlicensed channel is occupied by a User Equipment (UE), initiating transmission of Redundancy Versions (RVs) corresponding to a HARQ process on the unlicensed channel if the unlicensed channel is occupied by the UE, verifying if a channel occupancy period is over and an acknowledgement for the HARQ process is received from the unlicensed channel, and transmitting, subsequent RVs on a second carrier if the HARQ process is not completed in the current channel occupancy period, wherein the second carrier is one of the licensed channel or the unlicensed channel.

According to an embodiment of the present invention, a resource allocation signaling for the second carrier indicates the previous carrier on which the preceding RV was transmitted along with the associated HARQ process number corresponding to the preceding RV. A new field is added to a multicarrier HARQ index to indicate the carrier on which the previous RV of the associated HARQ process was transmitted.

According to an embodiment of the present invention, the method further comprises of defining a format for a PDCCH to indicate the channel for which the resource allocation is intended for the cross-carrier scheduling and the channel on which the last RV was transmitted and the associated HARQ process number. According to another embodiment of the present invention, the PDCCH is adapted to provide a bundling enabled indication if the bundling is enabled and a bundling frame indication to indicate occurrence of bundling in a sub-frame set in the indicated bit mask.

According to an embodiment of the present invention, enabling the multi-carrier HARQ is performed at the UE level, HARQ process level, channel level or eNB level. Here the multi-carrier HARQ is pre-specified to be enabled if the HARQ transmission is not completed in the current channel occupancy period of the associated unlicensed channel.

According to an embodiment of the present invention, the UE on receiving the multi-carrier HARQ enabling indication monitors all the activated channels for receiving the HARQ packets for the HARQ process, and one or more channels indicated by the eNB in which the multi-carrier HARQ process is active.

According to an embodiment of the present invention, the method further comprises of enabling a multi-carrier HARQ timer when a multi-carrier enabling indication is received, terminating the multi-carrier HARQ timer if the HARQ process is not completed within a duration of the multi-carrier HARQ timer, and clearing RVs stored in the HARQ buffers. According to another embodiment of the present invention, the method further comprises steps of checking if the multi-carrier HARQ timer is expired in the current channel occupancy period, and initiating the suspension timer if the multi-carrier HARQ timer is expired. According to another embodiment of the present invention, the method further comprises steps of receiving, by the eNB, a feedback from the UE based on RVs received in the multicarrier HARQ packet or a single carrier HARQ packet.

The foregoing has outlined, in general, the various aspects of the invention and is to serve as an aid to better understand the more complete detailed description which is to follow. In reference to such, there is to be a clear understanding that the present invention is not limited to the method or application of use described and illustrated herein. It is intended that any other advantages and objects of the present invention that become apparent or obvious from the detailed description or illustrations contained herein are within the scope of the present invention.

BRIEF DESCRIPTION OF THE DRAWINGS

The other objects, features and advantages will occur to those skilled in the art from the following description of the preferred embodiment and the accompanying drawings in which:

FIG. 3 is a schematic diagram illustrating bundling of RV's indicated by an indicator prior to the start of the bundling, according to an embodiment of the present invention;

FIG. 4 is a schematic diagram illustrating enabling of the bundling enabled after the first retransmission of the data packets, according to an embodiment of the present invention;

FIG. 5 is a schematic diagram illustrating enabling of the bundling after the last regular transmission in a channel occupancy period, according to an embodiment of the present invention;

FIG. 6 is a schematic diagram illustrating an indication of bundling configured per HARQ process, according to an embodiment of the present invention;

FIG. 7 is a schematic diagram illustrating the bundled RVs to start after initial transmission, according to an embodiment of the present invention;

FIG. 8 is a schematic diagram illustrating bundling to be enabled only after the last regular transmission in a channel occupancy period, according to an embodiment of the present invention;

FIG. 9 is a schematic diagram illustrating that the bundled RVs need not be transmitted in consecutive subframes, according to an embodiment of the present invention;

FIG. 10 is a schematic diagram illustrating that the maximum number of bundled RVs cannot be greater than the total number of RVs defined minus the number of RVs that have already been transmitted, according to an embodiment of the present invention;

FIG. 19 is a schematic diagram illustrating a process of sending multiple RVs of the HARQ process on multiple carriers simultaneously, according to an embodiment of the present invention;

FIG. 20 is a schematic diagram illustrating enablement of the multi-carrier HARQ by the eNB, according to an embodiment of the present invention;

FIG. 21 is a schematic diagram illustrating a process where the multi-carrier HARQ indicates which carriers can carry the HARQ packets for the multi-carrier HARQ, according to an embodiment of the present invention;

DETAILED DESCRIPTION

Figure 1:
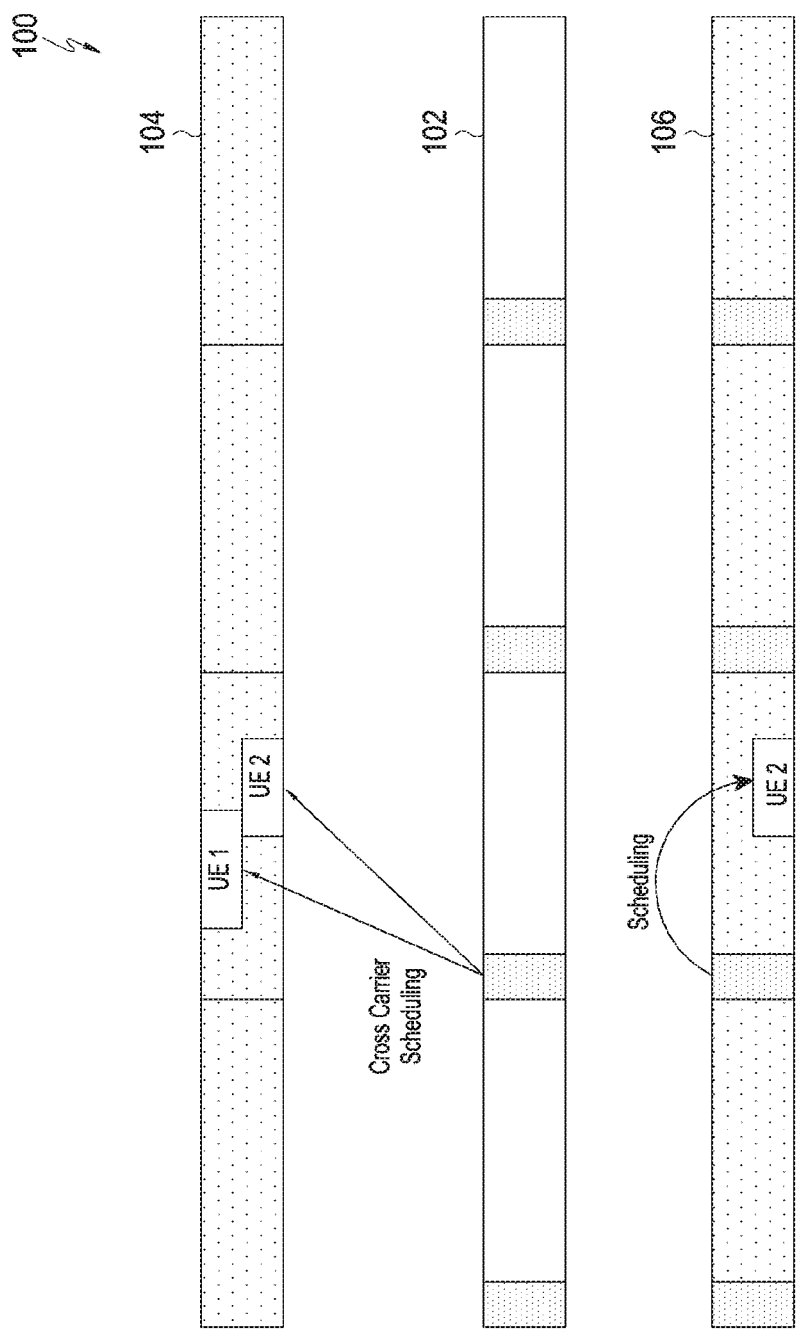
FIG. 1 is a schematic diagram illustrating the self-carrier mode and the cross carrier mode, according to the prior art illustration.
Figure 2:
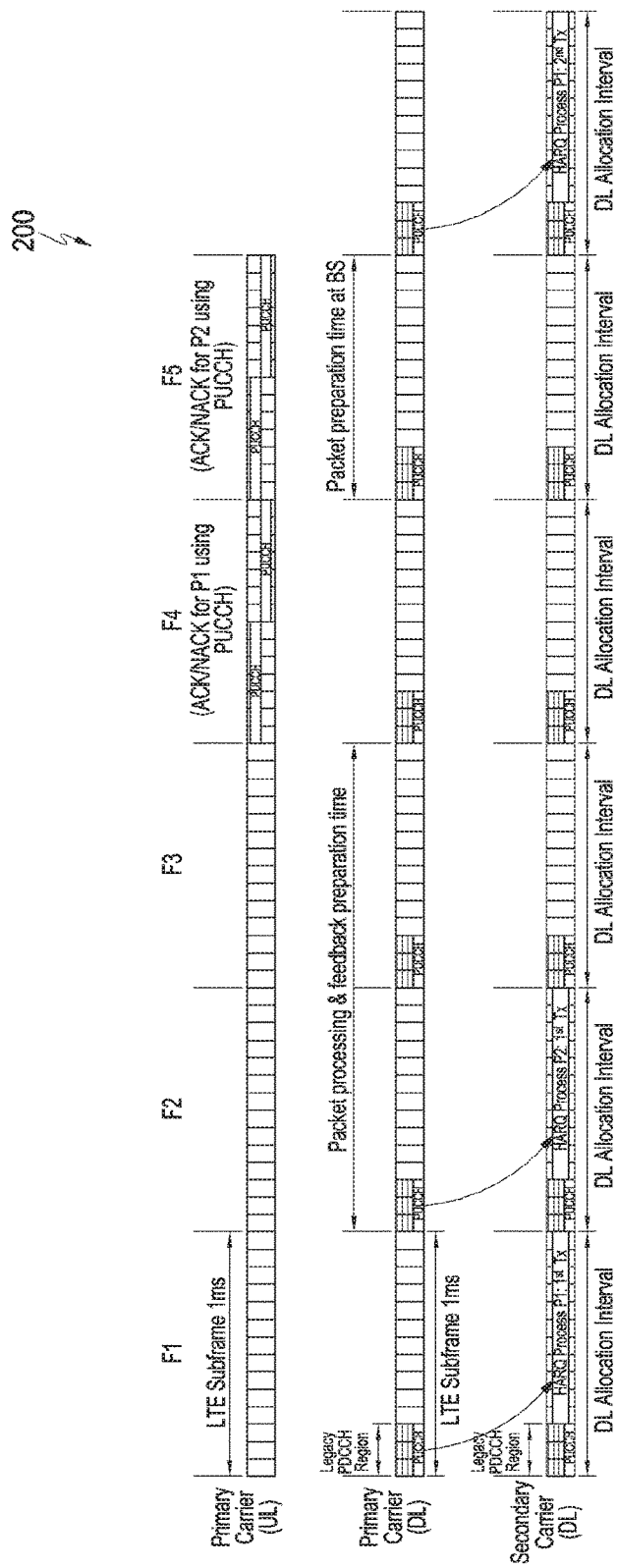
FIG. 2 is a schematic diagram illustrating the processing of the receiving data packet and also preparing of the corresponding HARQ ACK/NACK, according to the prior art illustration.

The various embodiments of the present invention disclose a method for performing hybrid repeat request (HARQ) in cellular operations over unlicensed bands. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features, integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention discloses methods for performing Hybrid Repeat Request (HARQ) in cellular operations over unlicensed spectrum. Various embodiments are described in the present disclosure to describe the working of the methods, without limiting the scope of the present invention. Various examples are used herein intended to facilitate an understanding of ways in which the embodiments herein can be practiced and to further enable those of skill in the art to practice the embodiments herein. Accordingly, the examples should not be construed as limiting the scope of the embodiments herein.

According to an embodiment of the present invention, the method for performing Hybrid Repeat Request (HARQ) in cellular operations over unlicensed bands is disclosed. The eNodeB (eNB) checks if an unlicensed channel is occupied by a User Equipment (UE), where the network holds a plurality of unlicensed channels and a licensed channel for the UE. If the licensed channel is pre-occupied by another UE, then the UE can occupy unlicensed channel for data transmission.

When the UE occupies the unlicensed channel for data transmission, the eNodeB initiates transmission of Redundancy Versions (RVs) corresponding to a Hybrid Repeat Request (HARQ) process on the unlicensed channel. In one embodiment of the invention, the eNB sends the RVs corresponding to a HARQ process without receiving an acknowledgement from the UE in a current channel occupancy time period. The eNB can transmit one or more RVs that are not yet transmitted to the UE. This transmission of the RVs without receiving the feedback for the previous transmission of the same packet is herein referred to as RV bundling. The RV bundling helps in guaranteeing higher decoding probability at the cost of overhead (due to lack of feedback) and it avoids any in-deterministic delay that is inadvertently present in the usage of the unlicensed channel which can negatively hamper the QoS requirements of the related ongoing traffic.

The eNodeB further verifies if the channel occupancy period is over and an acknowledgement for the HARQ process is received from the unlicensed channel. The channel occupancy for the unlicensed channel is allowed for a particular time period. The eNodeB verifies whether the channel occupancy period of the UE is over for the particular unlicensed channel. If the eNodeB identifies that the channel occupancy period is over for the particular unlicensed channel, then it also verifies whether any acknowledgement has been received for the particular unlicensed channel for the HARQ process carried out for the UE.

Further, eNodeB initiates a Redundancy Version (RV) bundling for retransmission of bundled RVs without awaiting an acknowledgment (ACK) for the HARQ process from the unlicensed channel, if the channel occupancy period is not over. If the eNodeB identifies that the channel occupancy is period is not over, then the eNodeB can initiate RV bundling for retransmission of RVs without awaiting for acknowledgement (ACK) for the HARQ process. The retransmission of the bundled RVs is carried so that if acknowledgement for any of the data packets in the HARQ process is not received due to any of the reasons, that includes, but not limited to, failure in delivery of the data packet, loss of network connectivity, lack of bandwidth, and the like, then the retransmission can provide an additional option or chance to retransmit the packet and obtain the acknowledgement for successful data transmission.

In an embodiment of the present invention, the eNB initiates RV bundling during at least one of, but not limited to, first retransmission of the RVs, last regular transmission of the RVs in the channel occupancy period, and the like. In another embodiment of the present invention, an indication for the RV bundling can be configured for the HARQ process by, at least one of, but not limited to, setting an indicator for RV bundling in a Physical Downlink Control Channel (PDCCH), using a MAC message or an RRC message at the UE level, sending a system information message for enabling bundling at a cell level, and the like.

The method further comprises of eNodeB sending an RV bundling indication to the UE. The eNodeB can transmit the RV bundling indication during HARQ process, wherein the RV bundling indication comprises of information such as, but not limited to, a start information of RV bundling, scheduling information of the bundled RVs, a maximum number of bundled RVs, and the like.

In an embodiment of the present invention, the start information of the RV bundling is one of, but not limited to, an absolute time period in units of sub frames, an indication of bundling after the regular retransmission of RVs, and the like. In another embodiment of the present invention, the scheduling information of the bundled RVs comprises of, but not limited to, an indication of the sub frame which includes the bundled RVs, wherein the bundled RVs are transmitted in consecutive sub-frames following the sub-frame in which the regular RV transmission is sent to the UE or non-consecutive sub-frames. In yet another embodiment of the present invention, the maximum number of bundled RV's which is transmitted to the UE is the difference of the total number of RVs and number of RVs previously transmitted in the channel occupancy period.

Further, the method comprises step of the UE sending an acknowledgement (ACK) to the eNB if UE decodes the data packet using the one or more RVs received irrespective of a number of the bundled RVs.

FIG. 3 is a schematic diagram illustrating bundling of RV's indicated by an indicator prior to the start of the bundling, according to an embodiment of the present invention. According to the diagram 300, the bundling of the RVs can be indicated by an indicator prior to the start of the bundling. This for example can be used even for the 1st transmission by the eNB even though the ACK can be received from the UE during the channel occupancy time.

FIG. 4 is a schematic diagram illustrating enabling of the bundling enabled after the first retransmission of the data packets, according to an embodiment of the present invention. According to the diagram 400, bundling of the RVs are indicated by an indicator prior to the start of the bundling. Further the bundling cis enabled after the 1st retransmission.

FIG. 5 is a schematic diagram illustrating enabling of the bundling after the last regular transmission in a channel occupancy period, according to an embodiment of the present invention. According to the diagram 500, bundling of the RVs can be indicated by an indicator prior to the start of the bundling, and the bundling can be enabled after the last regular transmission that is possible in the channel occupancy period. In an embodiment of the present invention, the bundling can be pre-specified to be enabled which implies that bundling is always enabled for the unlicensed channels, without departing from the scope of the invention.

FIG. 6 is a schematic diagram 600 illustrating an indication of bundling configured per HARQ process, according to an embodiment of the present invention. According to diagram 600, the indication of bundling can be configured per HARQ process. For example by setting an indicator in the DCI carried in the PDCCH for the preceding regular RV transmission. In another embodiment of the present invention, the bundling can be configured at a UE level by using a MAC message or an RRC message. In yet another embodiment, the bundling indication can be sent in a broadcast message like the system information message for enabling bundling at a cell level. In yet another embodiment, the enabling of bundling can be at a carrier level.

FIG. 7 is a schematic diagram illustrating the bundled RVs to start after initial transmission, according to an embodiment of the present invention. According to the diagram 700, along with the bundling indication, the start information of bundling is also sent to the UE. The start information can be an absolute time period in units of sub-frames or the start information can be relative information indicating that bundling may start after the indicated regular retransmission. In yet another embodiment, the start information can indicate that bundling may be enabled only after the last regular transmission in the channel occupancy period. For example, it can be indicated that bundling is always enabled, so that the UE always looks for bundled RVs (even starting from the first HARQ process in the channel occupancy period). In an alternative embodiment of the present invention, the bundling indication indicates that the bundled RVs will start after an initial transmission.

FIG. 8 is a schematic diagram illustrating bundling to be enabled only after the last regular transmission in a channel occupancy period, according to an embodiment of the present invention. According to the diagram 800, the bundling indication indicates that the RV bundling will be enabled only after the last regular transmission in the channel occupancy period is completed FIG. 9 is a schematic diagram illustrating that the bundled RVs need not be transmitted in consecutive subframes, according to an embodiment of the present invention. According to the diagram 900, the bundled RVs can be transmitted in consecutive sub-frames following the sub-frame in which the regular RV transmission is sent to the UE. Here the maximum number of bundled RVs cannot be greater than the difference of the total number of RV's defined for transmission and the number of RVs already been transmitted. In another embodiment, the scheduling information of the bundled RVs is sent to the UE. The scheduling information indicates which sub-frames can carry the bundled RVs such that the bundled RVs need not be transmitted in consecutive sub-frames.

It is to be noted that more than one RVs corresponding to an HARQ process may also be transmitted in the same sub-frame. In yet another embodiment, if the bundling is indicated or enabled, the UE scans for all the following sub-frames until the end of the channel occupancy period for any bundled RVs that are transmitted by the eNB. In another embodiment of the present invention, the maximum number of bundled RVs that can be sent to a UE is indicated to the UE so that after decoding the maximum number of the bundled RVs the UE can avoid further detection of the RVs. This indication can be sent for example, along with the bundling indication and it can be at HARQ process level or UE level or Cell level.

FIG. 10 is a schematic diagram illustrating that the maximum number of bundled RVs cannot be greater than the difference of the total number of RV's and the number of RVs that have already been transmitted, according to an embodiment of the present invention. According to the diagram 1000, the RVs are always bundled just following the regular RV transmission for which a subsequent retransmission is not possible in the current channel occupancy period due to the constraint of RTT (Re-Transmission Time). This will typically happen to the HARQ processes for which a regular transmission (either initial transmission or a retransmission) has been sent within the time corresponding to the time period equal to the channel occupancy time minus the RTT. The number of bundled RVs is equal to the number of the sub-frames in the time period that is difference between the channel occupancy time and the RTT. Here, the maximum number of bundled RVs cannot be greater than the total number of RVs defined minus the number of RVs that have already been transmitted.

In another embodiment of the present invention, the maximum number of bundled RVs is signaled to the UE. In yet another embodiment, the sub-frames which can carry the bundled RVs cis signaled to the UE. The indications of maximum number of bundled RVs and the sub-frames which can carry the bundled RVs are indicated at HARQ process level or UE level or Cell level or can be pre-specified with respect to the channel occupancy period. For example, it can be pre-specified that the last two sub-frames of the channel occupancy period will carry the bundled RVs.

In another embodiment of the present invention, the eNB signals which RVs corresponding to an ongoing HARQ process that will be send in a bundled manner. The eNB can decide the RVs to be sent for example, based on the current channel conditions of the UE. This can be indicated along with the indication of the bundling. Alternatively, the UE can scan the sub-frames in which bundling is expected and decode the PDCCH which will carry the RV indicator. In one embodiment, the eNB can send the RV carrying the most significant bits followed by consecutively lesser number of significant bits and so on. Alternatively, eNB can send the RVs which are not yet sent to the UE in a decreasing order of RVs carrying significant bits.

In another embodiment of the present invention, the resources for sending the feedback of the bundled RVs is sent along with the bundling enable indication. The UE sends one composite feedback irrespective of the number of bundled RVs. If using all the received RVs (the bundled and the non-bundled), the UE is able to decode the packet successfully. The UE further sends an ACK or sends a NACK. In one embodiment, if the UE is not able to decode the packet considering all the RVs are received, it does not send a no acknowledgement (NACK).

In another embodiment of the present invention, a dummy grant is sent in physical uplink shared channel (PUSCH) for transmission of the feedback of the bundled RVs. The UE sends one composite feedback irrespective of the number of bundled RVs. If using all the received RVs (the bundled and the non-bundled) the UE is able to decode the packet successfully, it sends an ACK else it sends a NACK.

In another embodiment of the present invention, a PUCCH resource in the unlicensed channel is defined based on the resources used for the data packets in the unlicensed channel. For example, the feedback resource can be mapped based on the resource of the last bundled RV. If bundling feedback and the PUCCH feedback collide, then the UE can multiplex the feedback on the PUSCH and send it to the network. This will be indicated by the PDCCH DCI newly designed for indicating the feedback.

According to another embodiment of the present invention, a method for performing Hybrid Repeat Request (HARQ) in cellular operations over unlicensed bands, comprising step of an eNodeB (eNB) checking if an unlicensed channel is occupied by a User Equipment (UE). Of all the available licensed channel and plurality of unlicensed channels, the eNodeB checks whether the UE is occupying any of the unlicensed channel.

Figure 11:
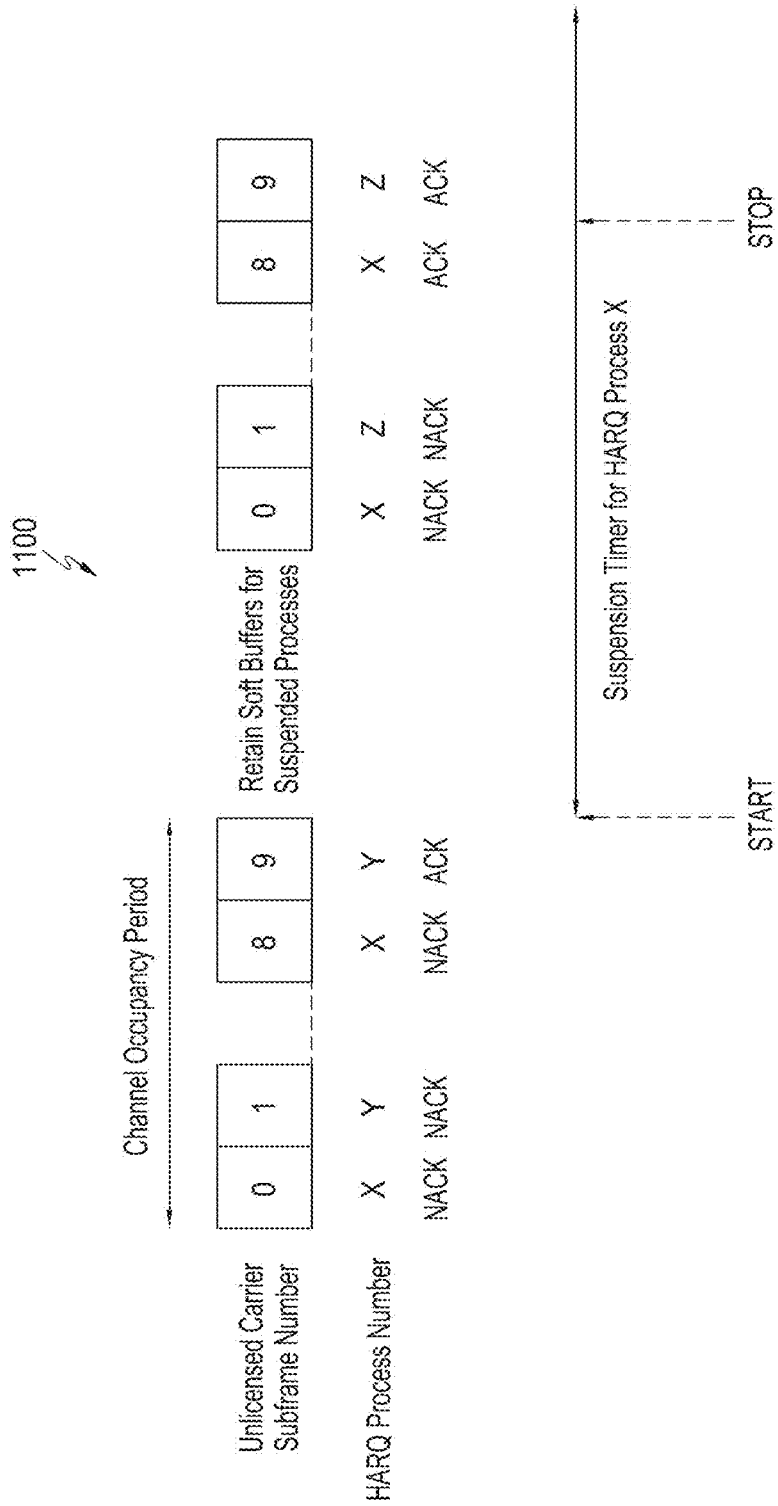
FIG. 11 is a schematic block diagram illustrating a process where UE retains the RVs for an HARQ process while the process is suspended, according to an embodiment of the present invention.

FIG. 11 is a schematic block diagram 1100 illustrating a process where UE retains the RVs for an HARQ process while the process is suspended, according to an embodiment of the present invention. According to the diagram 1100, if the HARQ process is not completed within the current channel occupancy period of the unlicensed channel, is the HARQ process is suspended for the time duration as per the configured suspension timer which is started when the current channel occupancy period ends. If the unlicensed channel is grabbed by the eNB, prior to the expiry of the suspension timer, the suspended HARQ processes are resumed. The UE retains the RVs for an HARQ process while the process is suspended. For example, the UE retains the already processed RVs for the suspended HARQ process in its HARQ buffers until the expiry of the suspension timer.

Figure 12:
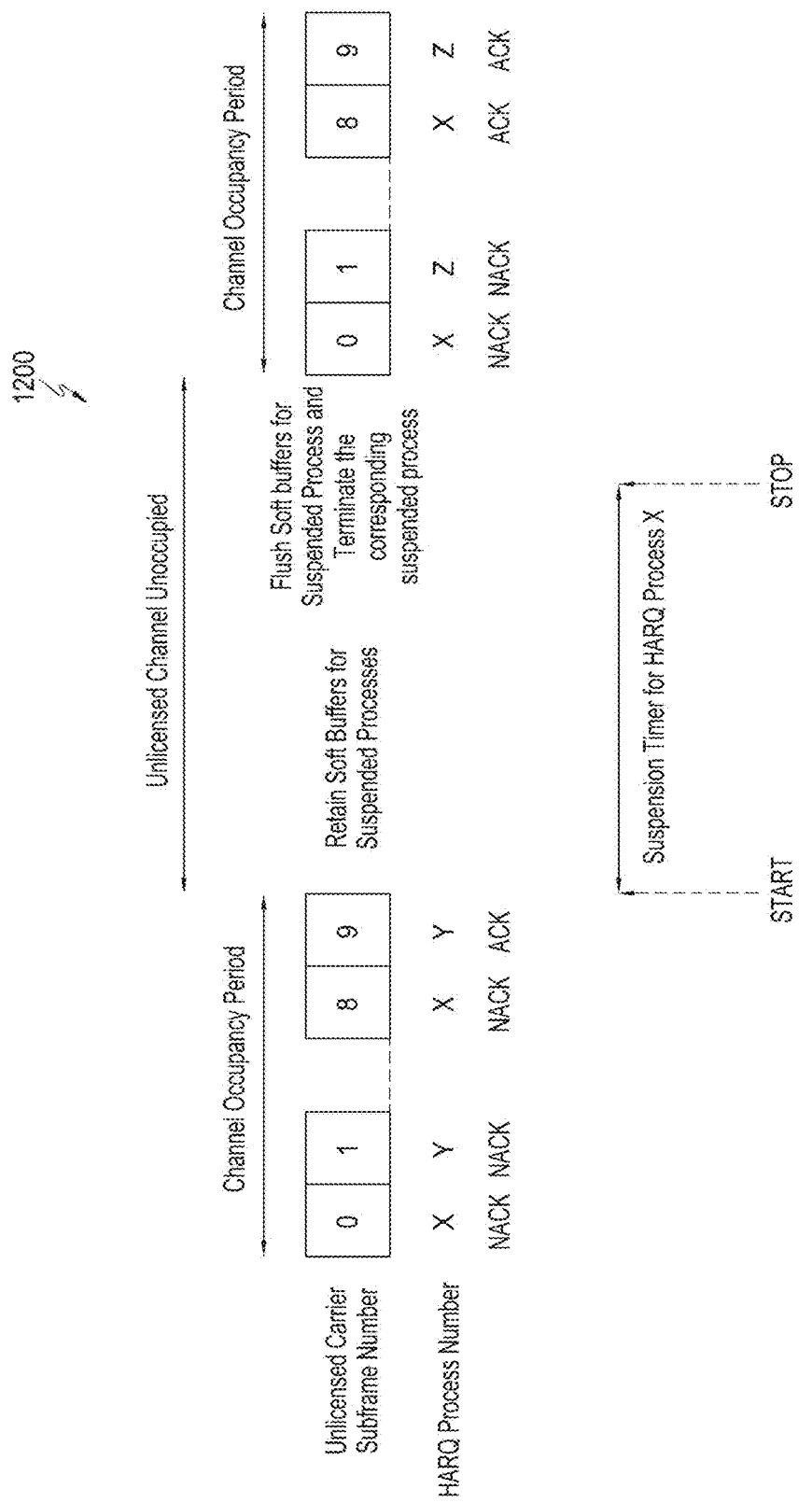
FIG. 12 is a schematic block diagram illustrating a process where UE removes the already processed RVs, according to an embodiment of the present invention.

FIG. 12 is a schematic block diagram illustrating a process where UE removes the already processed RVs, according to an embodiment of the present invention.

According to diagram 1200, the UE removes the already processed RVs (for example, flushes the HARQ buffers corresponding to the suspended HARQ processes) on the expiry of the timer and the corresponding HARQ process is considered as terminated.

Figure 13:
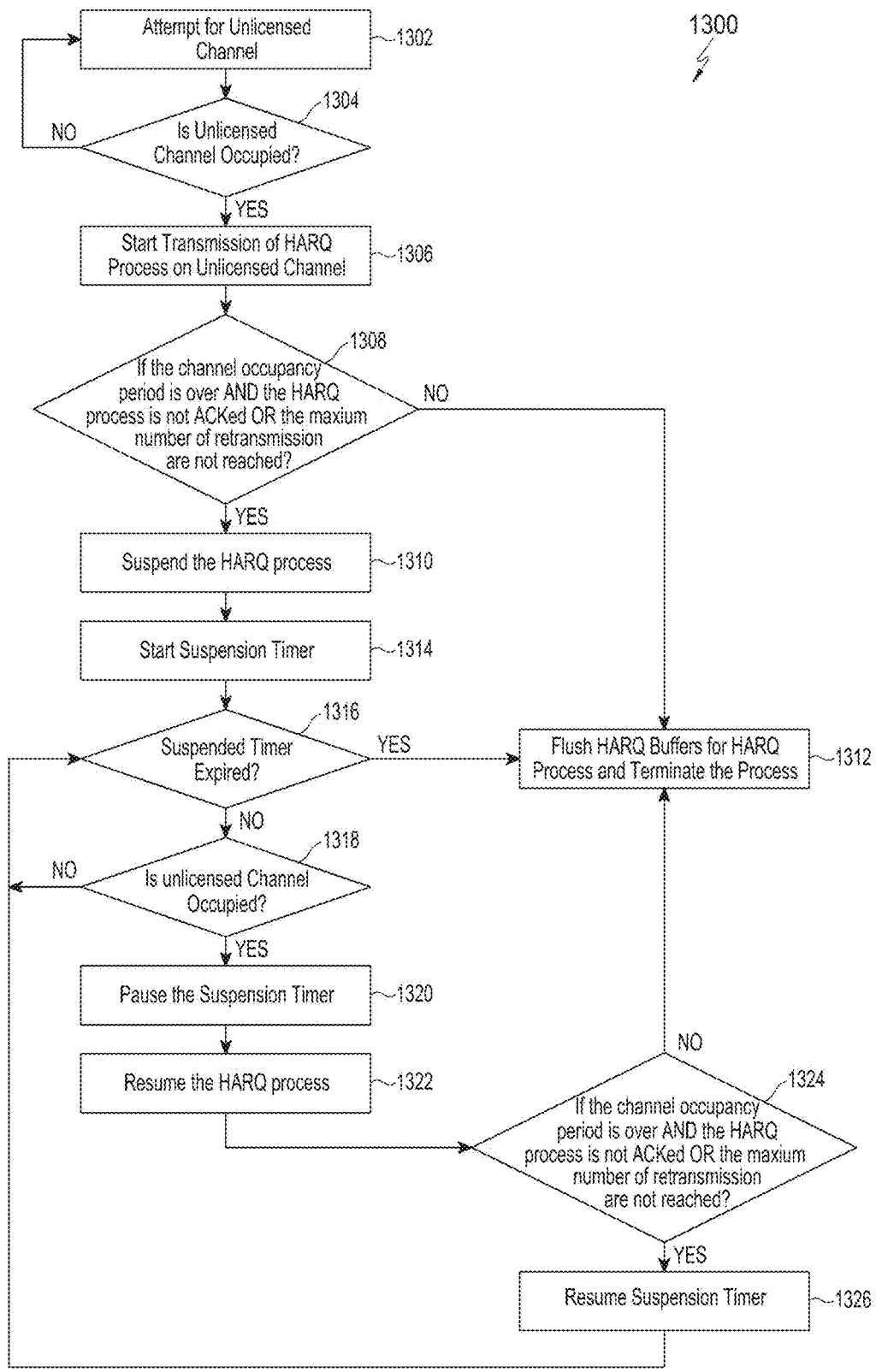
FIG. 13 is a schematic flow diagram illustrating the suspension timer operation, according to an embodiment of the present invention.

FIG. 13 is a schematic flow diagram 1300 illustrating the suspension timer operation, according to an embodiment of the present invention. According to the flow diagram 1300, at step 1302, an attempt is made by user equipment (UE) to occupy unlicensed channel for transmission of data packets. At step 1304, eNodeB eNB checks whether the unlicensed channel is occupied. If no, then the attempted for occupying the unlicensed channel is made again. If yes, then at step 1306, transmission of data packets associated with HARQ process can be started on unlicensed channel. At step 1308, it can be checked whether the channel occupancy period is over and the HARQ process is acknowledged for its transmission of data packets OR the maximum of re-transmissions are not reached. If yes, then at step 1310, the HARQ process can be suspended. If no, then at step 1312, the HARQ buffers associated with the HARQ process can be flushed and the process can be terminated.

Further, at step 1314, as soon as the HARQ process is suspended at step 1310, a suspension timer can be started. At step 1316, after pre-determined period of time, it can be checked whether the suspension timer is expired or not. If yes, then the process further goes to step 1312, and flushes the HARQ buffers associated with HARQ process along with terminating the process. If no, then at step 1318, it is further checked whether the unlicensed channel is occupied or not. If the unlicensed channel is not occupied, then the eNodeB waits for pre-determined period of time and again checks whether the suspension timer is expired or not. The process of checking for expiration of suspension timer continues until either expiration of suspension timer or till availability of unlicensed channel.

If the unlicensed channel is occupied at step 1318, then at step 1320, the suspension timer can be paused. At step 1322, the HARQ process can be resumed based on the conditions discussed herein above, and not described again to avoid repetition. At step 1324, it can be checked whether the channel occupancy period is over and the HARQ process is acknowledged for its transmission of data packets OR the maximum of re-transmissions are not reached. If yes, then at step 1326, the suspension timer can be resumed. Further, the suspension timer can be monitored at pre-determined timer period at step 1316. If no, then process goes to step 1312, wherein the HARQ buffers associated with the HARQ process can be flushed and the process can be terminated.

Figure 14:
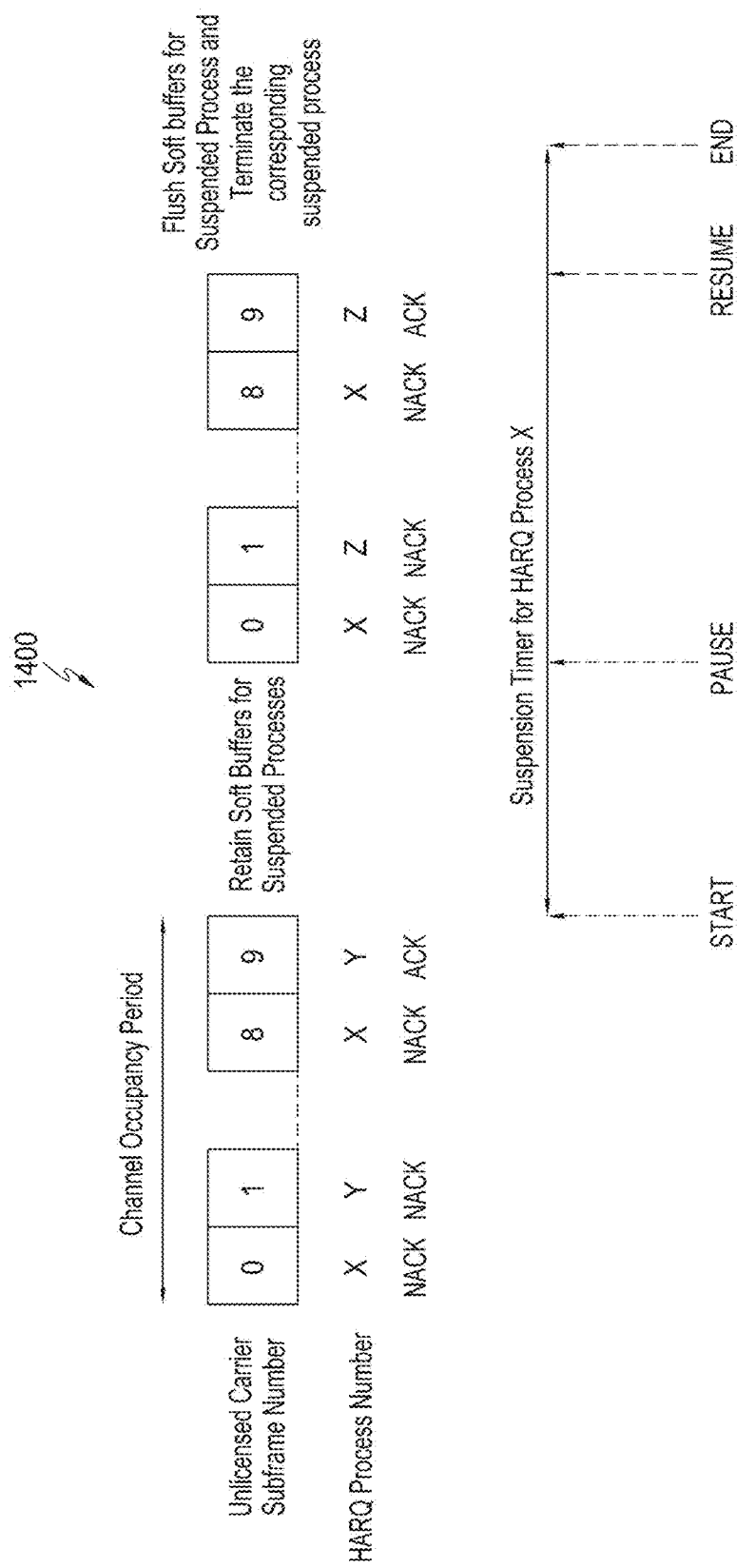
FIG. 14 is a schematic block diagram illustrating pausing of a suspension timer when the unlicensed channel is grabbed by the eNB, according to an embodiment of the present invention.

FIG. 14 is a schematic block diagram illustrating pausing of a suspension timer when the unlicensed channel is grabbed by the eNB, according to an embodiment of the present invention. According to the diagram 1400, the suspension timer is paused when the unlicensed channel is grabbed by the eNB. The suspension timer is then resumed when the current channel occupancy period ends and if the suspension timer running duration plus the current channel occupancy period does not exceed the configured value of the suspension timer.

In another embodiment of the present invention, the suspension timer can be configured per unlicensed carrier. In another embodiment, the suspension timer can be configured at a UE level. In another embodiment, the suspension timer can be configured per cell level.

In another embodiment of the present invention, the eNB can configure the suspension timer based on the channel occupancy rate of the unlicensed channel. For example, if the channel occupancy rate (by itself) is low then it can configure a large value for the suspension timer and vice versa. This can typically happen if the node density is high around the eNB and if the nodes are aggressively using the unlicensed channel. In another example, if the channel occupancy rate (by itself) is low then it can configure a low value for the suspension timer and vice versa. This will be particularly useful for fast clearing of the HARQ buffers.

In another embodiment of the present invention, the eNB can configure the suspension time based on the traffic requirements for the UE on the licensed channel. For example, if the traffic requirement on the licensed channel is high then a short value of suspension timer can be configured (so that more HARQ buffer is available to the licensed channels). In another embodiment, the eNB can configure the suspension timer based on the QoS of the traffic served on the corresponding unlicensed channel. If the latency is high then it can configure a larger value of the suspension timer. In another embodiment, the eNB can use a combination of one or more of the traffic requirements on the licensed channel, QoS of the traffic on the unlicensed channel and the channel occupancy rate to decide the value of the suspension timer.

Figure 15:
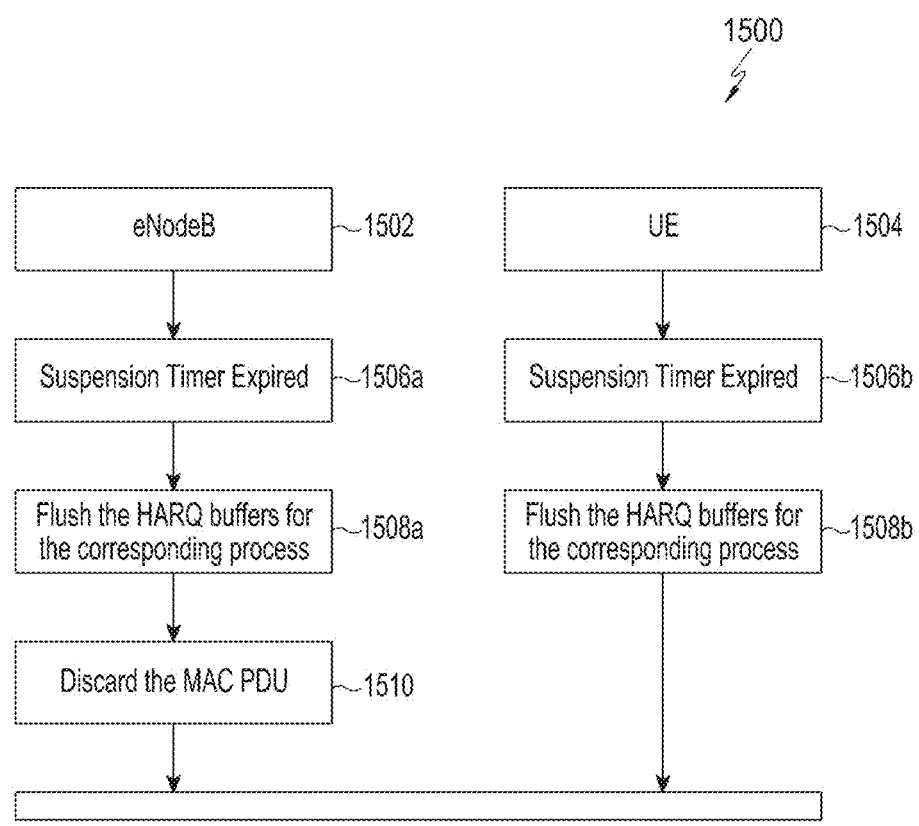
FIG. 15 is a schematic flow diagram illustrating a method of discarding the received RVs by the eNBs for the suspended HARQ process, according to an embodiment of the present invention.

FIG. 15 is a schematic flow diagram illustrating a method of discarding the received RVs by the eNBs for the suspended HARQ process, according to an embodiment of the present invention. According to the diagram 1500, suspension timer is expired at 1506a and 1506b for both eNodeB 1502 and user equipment (UE) 1504 respectively. Upon expiration of the suspension timer, at step 1508a, the eNodeB 1502 flushes HARQ buffer for the corresponding process. Similarly, at step 1508b, the UE 1504 flushes HARQ buffer for the corresponding process. Further, at step 1510, the eNodeB 1502 discards the received RVs for the suspended HARQ process. The higher layers for example RLC can take care of the subsequent retransmission at ARQ level.

Figure 16:
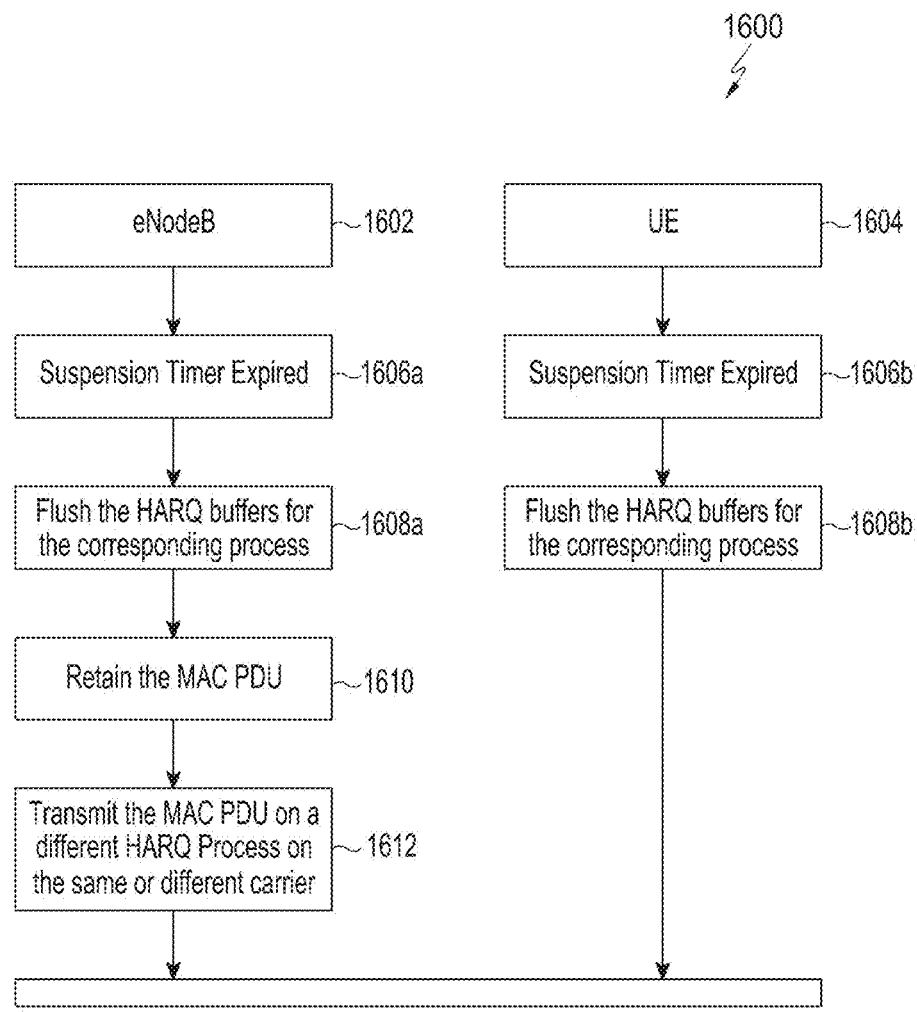
FIG. 16 is a schematic flow diagram illustrating a method of discarding the received RVs for the suspended HARQ by the UE, according to an embodiment of the present invention.

FIG. 16 is a schematic flow diagram illustrating a method of discarding the received RVs for the suspended HARQ by the UE by flushing the HARQ buffer, according to an embodiment of the present invention. According to the diagram 1600, suspension timer is expired at 1606a and 1606b for both eNodeB 1602 and user equipment (UE) 1604 respectively. Upon expiration of the suspension timer, at step 1608a, the eNodeB 1602 flushes HARQ buffer for the corresponding process. Similarly, at step 1608b, the UE 1604 flushes HARQ buffer for the corresponding process. Further, at step 1610, the eNodeB 1602 retains the MAC PDU corresponding to the suspended HARQ process. Further, at step 1612, the eNodeB 1602 transmits the MAC PDU on a different HARQ process on the same or different unlicensed carrier. For example, this can be used to continue the transmission of the MAC PDU on other carriers like licensed carrier.

Figure 17:
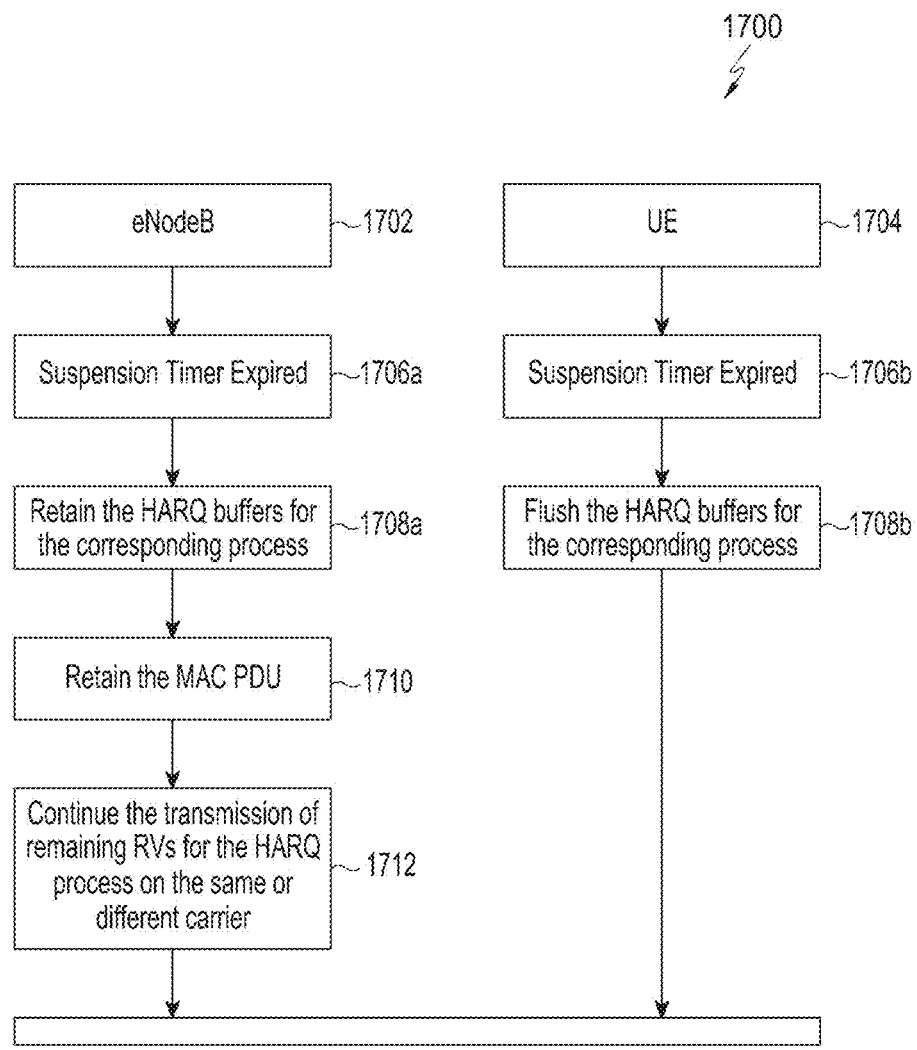
FIG. 17 is a schematic flow diagram illustrating a method where the eNB does not discard the received RVs for the suspended HARQ process, according to an embodiment of the present invention.

FIG. 17 is a schematic flow diagram illustrating a method where the eNB does not discard the received RVs for the suspended HARQ process, according to an embodiment of the present invention. According to the diagram 1700, suspension timer is expired at 1706a and 1706b for both eNodeB 1702 and user equipment (UE) 1704 respectively. Upon expiration of the suspension timer, at step 1708a, the eNodeB 1702 retains data packets present in the HARQ buffers for the corresponding process. At step 1708b, the UE 1704 flushes HARQ buffer for the corresponding process. Further, at step 1710, the eNodeB 1702 retains the MAC PDU corresponding to the suspended HARQ process. Further, at step 1712, the eNodeB 1702 continues transmission of remaining RVs for the HARQ process on a different HARQ process on the same or different unlicensed carrier.

In another embodiment of the present invention, the eNB indicates if the HARQ buffers need to be cleared by the UE upon expiry of the suspension timer. This for example, can be at the HARQ process level or UE level or Cell level indicator. In another embodiment, it can be pre-specified whether to clear the HARQ buffers upon expiry of the suspension timer or not.

According to another embodiment of the present invention, a method for performing Hybrid Repeat Request (HARQ) in cellular operations over unlicensed bands, the method comprising steps of an eNodeB (eNB) checking if an unlicensed channel is occupied by a User Equipment (UE). Of all the available licensed channel and plurality of unlicensed channels, the eNodeB checks whether the UE is occupying any of the unlicensed channel.

Further, the method comprises step of eNodeB initiates transmission of Redundancy Versions (RVs) corresponding to a Hybrid Repeat Request (HARQ) process on the unlicensed channel if the unlicensed channel is occupied by the UE. Upon identifying that the UE occupies unlicensed channel, then the eNodeB initiates transmission of redundancy versions (RVs) corresponding to the HARQ process. Further, the method comprises step of eNodeB verifying if a channel occupancy period is over and an acknowledgement for the HARQ process is received from the unlicensed channel. The channel occupancy for the unlicensed channel is allowed for particular time period. The eNodeB verifies whether the channel occupancy period of the UE is over for the particular unlicensed channel. If the eNodeB identifies that the channel occupancy period is over for the particular unlicensed channel, then it also verifies whether any acknowledgement has been received for the particular unlicensed channel for the HARQ process carried out for the UE.

Further, the method comprises step of transmitting subsequent RVs on a second carrier if the HARQ process is not completed in the current channel occupancy period, wherein the second carrier is one of the licensed channel or the unlicensed channel. Upon identifying that the channel occupancy period is over for the particular unlicensed channel and the UE has not received any acknowledgement for the transmitted RVs of the HARQ process, then eNodeB identifies that the current channel occupancy period is over without completion of the HARQ process, and hence the subsequent RVs of the HARQ process can be transmitted on the second carrier, wherein the second carrier is one of the licensed channel or the unlicensed channel.

In an embodiment of the present invention, a resource allocation signaling for the second carrier indicates the previous carrier on which the preceding RV was transmitted along with the associated HARQ process number corresponding to the preceding RV, where a new field is added to a multicarrier HARQ index to indicate the carrier on which the previous RV of the associated HARQ process was transmitted.

Further, the method comprises step of defining a format for a PDCCH to indicate the channel for which the resource allocation is intended for the cross-carrier scheduling and the channel on which the last RV was transmitted and the associated HARQ process number. In an embodiment of the present invention, the PDCCH is adapted to provide a bundling enabled indication if the bundling is enabled and a bundling frame indication to indicate occurrence of bundling in a sub-frame set in the indicated bit mask. In another embodiment of the present invention, enabling the multi-carrier HARQ is performed at the UE level, HARQ process level, channel level or eNB level.

In another embodiment of the present invention, enabling the multi-carrier HARQ is performed at the UE level, HARQ process level, channel level or eNB level. In another embodiment of the present invention, the multi-carrier HARQ is pre-specified to be enabled if the HARQ transmission is not completed in the current channel occupancy period of the associated unlicensed channel. In another embodiment of the present invention, the UE on receiving the multi-carrier HARQ enabling indication monitors one or more of, but not limited to, all the activated channels for receiving the HARQ packets for the HARQ process, one or more channels indicated by the eNB in which the multi-carrier HARQ process is active, and the like.

In another embodiment of the present invention, the method further comprises of enabling a multi-carrier HARQ timer when a multi-carrier enabling indication is received. Further, the method comprises of terminating the multi-carrier HARQ timer if the HARQ process is not completed within duration of the multi-carrier HARQ timer. Further, the method comprises of clearing RVs stored in the HARQ buffers.

In another embodiment of the present invention, the method further comprises of checking if the multi-carrier HARQ timer is expired in the current channel occupancy period, and initiating the suspension timer if the multi-carrier HARQ timer is expired. In another embodiment of the present invention, the method further comprises of receiving, by the eNB, a feedback from the UE based on RVs received in the multicarrier HARQ packet or a single carrier HARQ packet.

Figure 18:
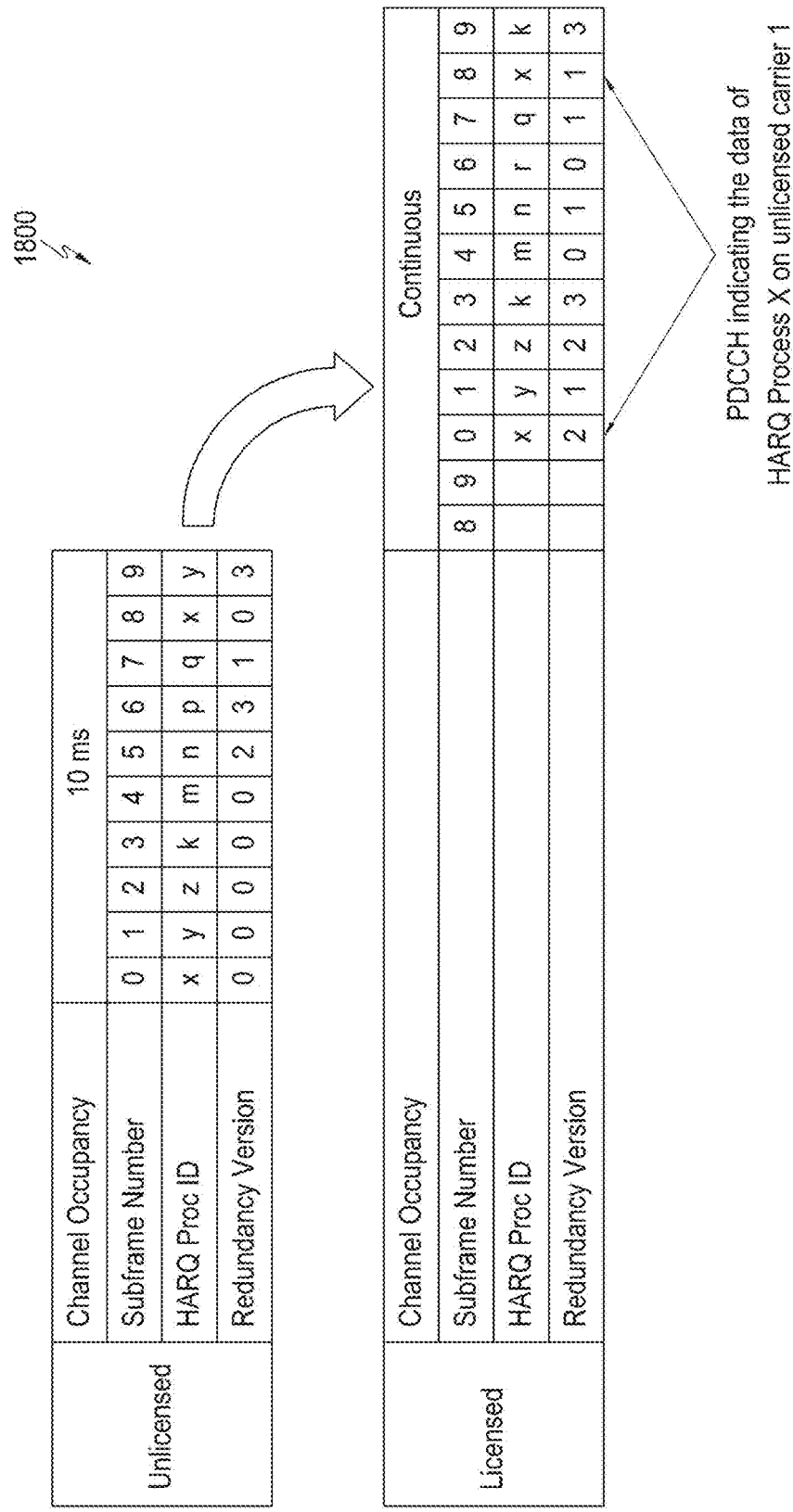
FIG. 18 is a schematic diagram illustrating a process where the RVs subsequent to the RV sent on the second carrier is on a first carrier or second carrier or any other carrier, according to an embodiment of the present invention.

FIG. 18 is a schematic diagram 1800 illustrating that the RVs subsequent to the RV sent on the second carrier can be sent on first carrier or second carrier or any other carrier, according to an embodiment of the present invention. According to the diagram 1800, if the HARQ process could not be completed in the current channel occupancy time period, the subsequent RV can be sent on a second carrier. The second carrier herein can be an unlicensed carrier or a licensed carrier. Further the RVs transmitted subsequent to the RV sent on the second carrier can be sent on the first carrier or the second carrier or any other carrier. The HARQ procedure is further referred to as multi-carrier HARQ. If multi-carrier HARQ is enabled then the transmitter and the receiver retain the HARQ buffers for continuing the transmission of the subsequent RVs.

TABLE 1

Format 5 for bundling indication

| Field Name | Length (Bits) | Comment |
|---|---|---|
| DCI 1A/DCI 0 separation flag | 1 | |
| Localized/Distributed VRB assignment flag | 1 | |
| N_Gap | 1 | Applicable for VRB when distributed and localized |
| Resource block assignment for Localized or distributed RB | 5 (1.4 Mhz) 7 (3 Mhz) 9 (5 Mhz) 11 (10 Mhz) 12 (15 Mhz) 13 (20 Mhz) | Same resource can be reused for bundling data |
| MCS | 5 | |
| HARQ Process | 3 (FDD) 4 (TDD) | |
| RV | 2 | |
| TPC for PUCCH | 2 | Used for power control section |
| Bundling enabled | 1 | Indicates if bundling is enabled |
| Frame indication | 9 | Indicates that bundling will occur in a subframe set in the bit mask. If all the bits are zero then contiguous n-k subframe from the current subframe where n max retransmission and k remaining retransmission. In case of TDD the contiguous n-k subframes pertaining to DL |

TABLE 2

DCI format 5A

| Field Name | Length (Bits) | Comment |
|---|---|---|
| Localized/Distributed VRB assignment flag | 1 | |
| N_Gap | 1 | Applicable only when Localized/Distributed VRB assignment flag is 1 (Distributed) and BW >= 10 Mhz 0 = N-Gap 1 1 = N-Gap 2 |
| Resource block assignment for Localized DRB | 5 (1.4 Mhz) 7 (3 Mhz) 9 (5 Mhz) 11 (10 Mhz) 12 (15 Mhz) 13 (20 Mhz) | See 36.213 8.1 |
| MCS | 5 | |
| HARQ Process | 3 (FDD) 4 (TDD) | |

TABLE 2-continued

DCI format 5A

| Field Name | Length (Bits) | Comment |
|---|---|---|
| RV | 2 | |
| TPC for PUCCH | 2 | See Power Control section |
| Multicarrier HARQ Index | 4 | Indicates which carrier takes up the bundling data. If this DCI is received in carrier X and the Multicarrier HARQ Index received shows that the bundling is for carrier K then the information about the RV and HARQ Proc mentioned in this DCI will be used by the UE to combine with the respective HARQ buffer for the same HARQ Proc received from another carrier |

TABLE 3

Format 5B for MC bundling indication

| Field Name | Length (Bits) | Comment |
|---|---|---|
| Localized/Distributed VRB assignment flag | 1 | |
| N_Gap | 1 | Applicable only when Localized/Distributed VRB assignment flag is 1 (Distributed) and BW >= 10 Mhz<br>0 = N-Gap 1<br>1 = N-Gap 2 |
| Resource block assignment for Localized DRB | 5 (1.4 Mhz)<br>7 (3 Mhz)<br>9 (5 Mhz)<br>11 (10 Mhz)<br>12 (15 Mhz)<br>13 (20 Mhz) | See 36.213 8.1 |
| MCS | 5 | |
| HARQ Process | 3 (FDD)<br>4 (TDD) | |
| RV | 2 | |
| TPC for PUCCH | 2 | See Power Control section |
| Multicarrier Bundling enabled | 1 | Indicates if bundling is enabled and multicarrier that carry bundling. Next field will only make sense if the current bit is set to 1. If this field is kept to 1 and next fields are not present then the UE is expected to measure all the configured carriers and all the subframes |
| Multicarrier HARQ Bundling Carriers | 16 | Indicates which carrier to measure the DCI once multi carrier is enabled |
| Bundling Frame indication | 9 | If all bits are 0. Then any subframe of the configuredMC. Else the subframes set only to be measured |

In an embodiment of the present invention, the resource allocation signaling for the current carrier can indicate the carrier on which the preceding RV was transmitted along with the associated HARQ process number corresponding to the preceding RV. This is illustrated in Table 2, wherein a new filed of Multicarrier HARQ Index is added which indicates the carrier on which the previous RV of the associated HARQ process was transmitted. For example, a new DCI format can be defined for PDCCH which indicates the carrier for which the resource allocation is intended for the cross carrier scheduling and the carrier on which the last RV was transmitted and the associated HARQ process number.

Table 1 indicates that PDCCH signals the bundling indication and the bundling frame indication wherein bundling enabled indicates if the bundling is enabled and the bundling frame indication indicates that bundling will occur in a subframe set in the indicated bit mask. Table 3 indicates that PDCCH signals the multicarrier bundling enabled indication and the associated carriers which carry the multicarrier bundled HARQ packets and the bundling frame indication which indicates the subframes which carry the bundled RVs.

In Table 3, if last two field of multicarrier HARQ carriers and bundling frame indication are not sent then UE interprets this as multicarrier HARQ being enabled and will monitor all the sub-frames on all the configured carriers. In Table 1, if bundling sub-frame indication is not sent then the UE interprets it as bundling is enabled and is contiguous in the assigned carrier. Similarly all possible combinations of the newly defined fields can be used for example by defining a new DCI for each combination.

FIG. 19 is a schematic diagram illustrating a process of sending multiple RVs of the HARQ process on multiple carriers simultaneously, according to an embodiment of the present invention. According to the diagram 1900, multiple RVs of the HARQ process can be sent on multiple carriers simultaneously wherein the carriers are among the activated carriers.

FIG. 20 is a schematic diagram illustrating enablement of the multi-carrier HARQ by the eNB, according to an embodiment of the present invention. According to the diagram 2000, the multi-carrier HARQ can be enabled by the eNB. For example, enabling of multi-carrier HARQ can be at a UE level, HARQ Process level, Carrier level or at Cell level. The UE after receiving the enabling indication needs to monitor all the activated carriers for receiving the HARQ packets for the HARQ process. In another embodiment of the present invention, the multi-carrier HARQ can be pre-specified to be enabled for example, when the HARQ transmission could not be completed in the current channel occupancy period of the associated unlicensed channel.

In another embodiment of the present invention, the eNB can also indicate when the multi-carrier can be started after enabling. The start can be given in terms of sub-frame offset or can be indicated to start after the 'n' transmission of the HARQ process. For example, the multi-carrier HARQ starts after the 1st re-transmission. Alternatively, the multi-carrier HARQ can be indicated to start (if enabled) after the current occupancy period of the associated unlicensed channel ends. In another embodiment, the multi-carrier HARQ can be pre-specified to start (if enabled) after the current occupancy period of the associated unlicensed channel ends. In another embodiment the multi-carrier HARQ can be started after a pre-configured or pre-specified time duration after the end of the channel occupancy period.

FIG. 21 is a schematic diagram illustrating a process where the multi-carrier HARQ indicates which carriers can carry the HARQ packets for the multi-carrier HARQ, according to an embodiment of the present invention. According to the diagram 2100, the multi-carrier HARQ also indicates which carriers can carry the HARQ packets for multi-carrier HARQ. The UE then only needs to monitor the indicated carriers for receiving the HARQ packets after receiving the multi-carrier HARQ enabling indication.

In another embodiment of the present invention, a multi-carrier HARQ timer can be used along with the above embodiments. If the HARQ process is not completed during the duration of the multi-carrier HARQ timer, the HARQ timer is terminated and the HARQ buffers at both the transmitter and the receiver can be cleared. The multi-carrier HARQ timer is started when the multi-carrier enabling indication is received. In another embodiment of the present invention, the suspension timer is started upon the expiry of the multicarrier HARQ timer.

In another embodiment of the present invention, the receiver (UE) can send the feedback on the configured feedback resources which are mapped based on the resources in which the RV was sent. The eNB based on whether a multicarrier HARQ packet was sent or a single carrier HARQ packet was sent can interpret the feedback accordingly.

Figure 22:
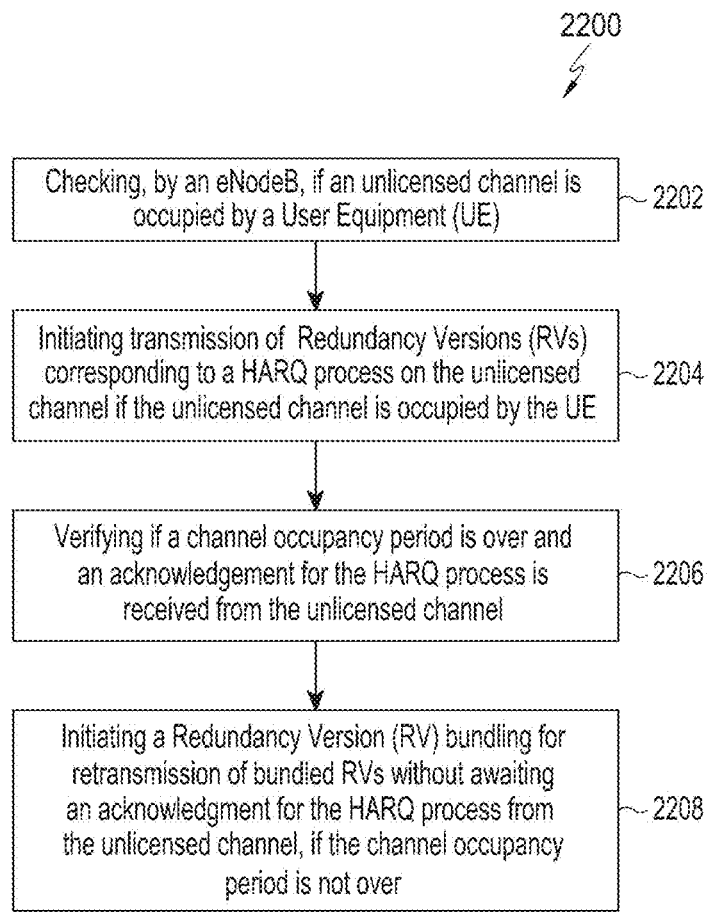
FIG. 22 is a schematic flow diagram illustrating a method for performing Hybrid Repeat Request (HARQ) in cellular operations over unlicensed bands, according to an embodiment of the present invention.

FIG. 22 is a schematic flow diagram 2200 illustrating a method for performing Hybrid Repeat Request (HARQ) in cellular operations over unlicensed bands, according to an embodiment of the present invention. According to the flow diagram 2200, at step 2202, checking, by an eNodeB, if an unlicensed channel is occupied by a User Equipment (UE). At step 2204, initiating transmission of Redundancy Versions (RVs) corresponding to a HARQ process on the unlicensed channel if the unlicensed channel is occupied by the UE. At step 2206, verifying if a channel occupancy period is over and an acknowledgement for the HARQ process is received from the unlicensed channel. At step 2208, initiating a Redundancy Version (RV) bundling for retransmission of bundled RVs without awaiting an acknowledgment for the HARQ process from the unlicensed channel, if the channel occupancy period is not over.

Figure 23:
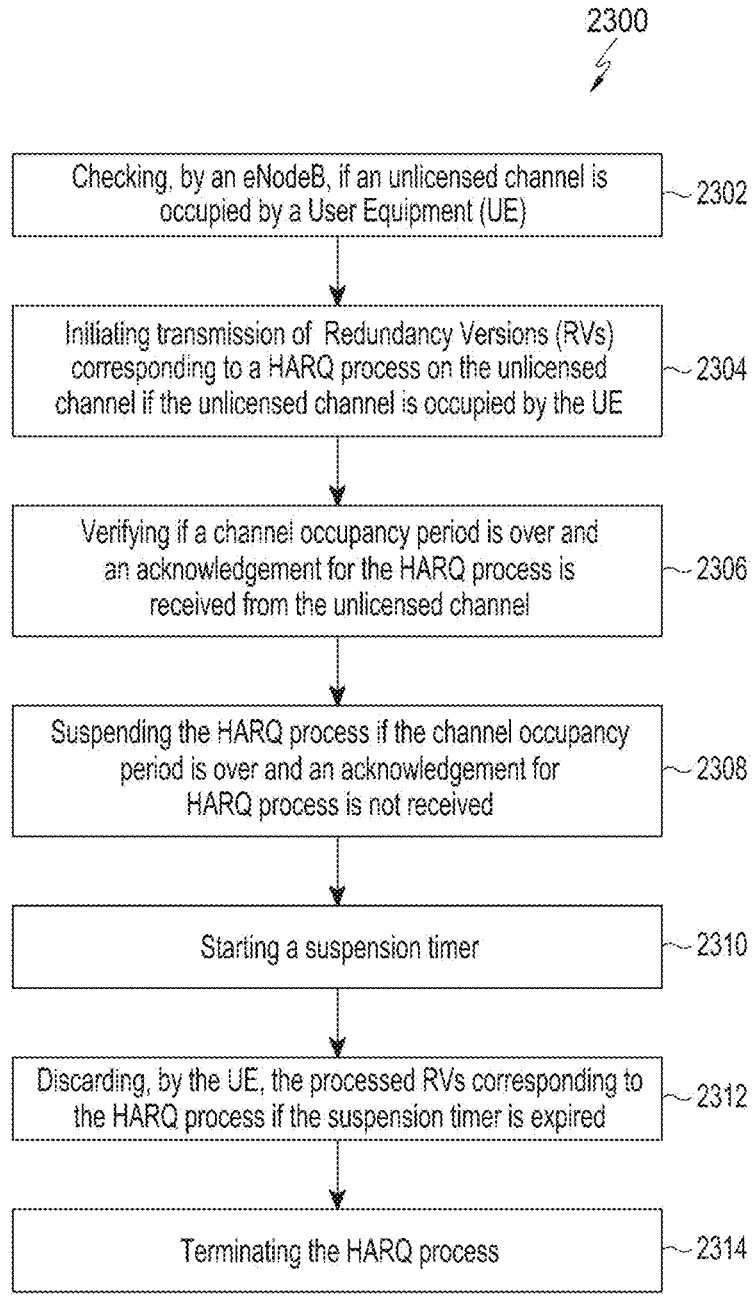
FIG. 23 is a schematic flow diagram illustrating a method for performing Hybrid Repeat Request (HARQ) in cellular operations over unlicensed bands, according to another embodiment of the present invention.

FIG. 23 is a schematic flow diagram 2300 illustrating a method for performing Hybrid Repeat Request (HARQ) in cellular operations over unlicensed bands, according to another embodiment of the present invention. According to the flow diagram 2300, at step 2302, checking if an unlicensed channel is occupied by a User Equipment (UE). At step 2304, initiating transmission of Redundancy Versions (RVs) corresponding to a HARQ process on the unlicensed channel if the unlicensed channel is occupied by the UE. At step 2306, verifying if a channel occupancy period is over and an acknowledgement for the HARQ process is received from the unlicensed channel. At step 2308, suspending the HARQ process if the channel occupancy period is over and an acknowledgement for HARQ process is not received. At step 2310, starting a suspension timer. At step 2312, discarding, by the UE, the processed RVs corresponding to the HARQ process if the suspension timer is expired. At step 2314, terminating the HARQ process.

Figure 24:
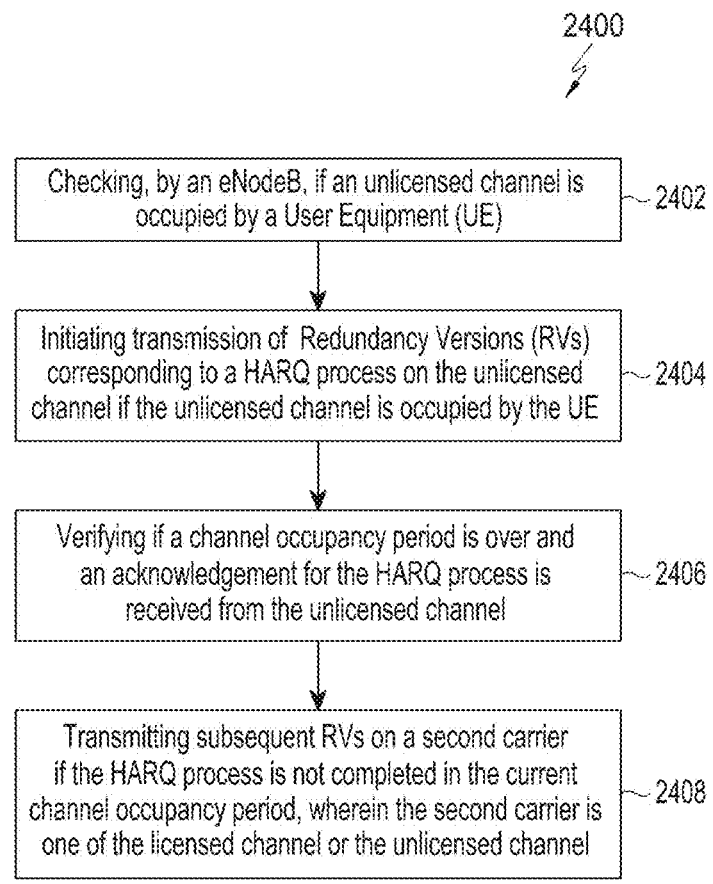
FIG. 24 is a schematic flow diagram illustrating a method for performing Hybrid Repeat Request (HARQ) in cellular operations over unlicensed bands, according to another embodiment of the present invention; and Although specific features of the present invention are shown in some drawings and not in others, this is done for convenience only as each feature may be combined with any or all of the other features in accordance with the present invention.

FIG. 24 is a schematic flow diagram 2400 illustrating a method for performing Hybrid Repeat Request (HARQ) in cellular operations over unlicensed bands, according to another embodiment of the present invention. According to the flow diagram 2400, at step 2402, checking, by an eNodeB, if an unlicensed channel is occupied by a User Equipment (UE). At step 2404, initiating transmission of Redundancy Versions (RVs) corresponding to a HARQ process on the unlicensed channel if the unlicensed channel is occupied by the UE. At step 2406, verifying if a channel occupancy period is over and an acknowledgement for the HARQ process is received from the unlicensed channel. At step 2408, transmitting subsequent RVs on a second carrier if the HARQ process is not completed in the current channel occupancy period, wherein the second carrier is one of the licensed channel or the unlicensed channel.

In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

What is claimed is:

1. A method for performing hybrid repeat request (HARQ) in cellular operations over unlicensed bands, comprising:
   identifying, by an eNodeB (eNB), whether an unlicensed channel is occupied by a user equipment (UE);
   transmitting, by the eNB, redundancy versions (RVs) corresponding to a HARQ process on the unlicensed channel, in response to the unlicensed channel being occupied by the UE;
   identifying whether a channel occupancy period of the unlicensed channel is over and an acknowledgement (ACK) for the HARQ process is received from the unlicensed channel; and
   in response to the channel occupancy period of the unlicensed channel not being over, transmitting bundled RVs associated with the RVs.

2. The method of claim 1, wherein the eNB initiates RV bundling for the bundled RVs with at least one of:
   a first retransmission of the RVs; or
   a last regular transmission of the RVs in the channel occupancy period.

3. The method of claim 1, wherein an indication of RV bundling for the bundled RVs is configured for the HARQ process by:
   setting an indicator for the RV bundling in a physical downlink control channel (PDCCH) based on a media access control (MAC) message or a radio resource control (RRC) message; and
   transmitting the indicator included in a system information message.

4. The method of claim 1, further comprising:
   transmitting, by the eNB, an RV bundling indication to the UE, the RV bundling indication comprising a start information of RV bundling for the bundled RVs, scheduling information of the bundled RVs and a maximum number of the bundled RVs; and
   receiving, by the eNB, the ACK from the UE, the ACK corresponding to a data packet decoded using one or more RVs among the RVs and the bundled RVs,
   wherein the scheduling information of the bundled RVs comprises:
   an indication of a sub-frame that includes the bundled RVs, where the bundled RVs are transmitted in consecutive sub-frames following the sub-frame in which a regular RV transmission is sent to the UE or in non-consecutive sub-frames.

5. The method of claim 1, further comprising:
   suspending the HARQ process and starting a suspension timer, in response to the channel occupancy period being over and the ACK for the HARQ process not being received,
   wherein the RVs corresponding to the HARQ process are discarded if the suspension timer is expired, and the HARQ process is terminated.

6. The method of claim 5, wherein a suspension timer value is configured based on at least one of:

a channel occupancy rate of the unlicensed channel;
traffic requirements for the UE on a licensed channel;
a quality of service (QoS) of a traffic served on the unlicensed channel; or
a combination of the traffic requirements on the licensed channel, the QoS of the traffic on the unlicensed channel and the channel occupancy rate.

7. The method of claim 5, further comprising:
discarding, by the eNB, at least one RV stored in HARQ buffers of the HARQ process in response to the suspension timer being expired;
retaining a media access control (MAC) protocol data unit (PDU) corresponding to the HARQ process; and
initiating another HARQ process for the retained MAC PDU on the unlicensed channel.

8. The method of claim 5, further comprising:
retaining, by the eNB, a media access control (MAC) protocol data unit (PDU) corresponding to the HARQ process and HARQ buffers of the HARQ process, in response to the suspension timer being expired; and
transmitting remaining RVs for the HARQ process on the unlicensed channel or a licensed channel.

9. The method of claim 1, further comprising:
transmitting subsequent RVs on a second carrier in response to the HARQ process not being completed in the channel occupancy period, wherein the second carrier is one of a licensed channel or the unlicensed channel.

10. The method of claim 9, wherein a resource allocation signaling for the second carrier indicates a previous carrier on which a preceding RV was transmitted along with an associated HARQ process number corresponding to the preceding RV, where a new field is added to a multicarrier HARQ index to indicate the previous carrier on which the preceding RV of the associated HARQ process was transmitted.

11. The method of claim 10, further comprising:
defining a format for a physical downlink control channel (PDCCH) to indicate the channel for which a resource allocation is intended for a cross-carrier scheduling and a channel on which a last RV was transmitted and the associated HARQ process number,
wherein the PDCCH is adapted to provide a bundling enabled indication if the bundling is enabled and a bundling frame indication to indicate occurrence of bundling in a sub-frame set in an indicated bit mask.

12. The method of claim 9, further comprising:
enabling a multi-carrier HARQ timer in response to a multi-carrier enabling indication being received;
discarding, by the eNB, at least one RV stored in HARQ buffers of the HARQ process in response to the HARQ process not being completed within a duration of the multi-carrier HARQ timer;
starting a suspension timer in response to the multi-carrier HARQ timer being expired in the channel occupancy period; and
receiving, by the eNB, a feedback from the UE based on RVs provided via a multi-carrier HARQ packet or a single-carrier HARQ packet.

13. An apparatus for performing hybrid repeat request (HARQ) in cellular operations over unlicensed bands, the apparatus comprising:
a transceiver configured to transmit and receive data; and
at least one processor configured to control to:
identify whether an unlicensed channel is occupied by a user equipment (UE);
transmit redundancy versions (RVs) corresponding to a HARQ process on the unlicensed channel if the unlicensed channel is occupied by the UE;
identify whether a channel occupancy period of the unlicensed channel is over and an acknowledgement (ACK) for the HARQ process is received from the unlicensed channel; and
in response to the channel occupancy period of the unlicensed channel not being over, transmit bundled RVs associated with the RVs.

14. The apparatus of claim 13, wherein RV bundling for the bundled RVs is initiated with at least one of:
a first retransmission of the RVs; or
a last regular transmission of the RVs in the channel occupancy period.

15. The apparatus of claim 13, wherein the processor is further configured to control to:
transmit an RV bundling indication to the UE, wherein the RV bundling indication comprises a start information of RV bundling for the bundled RVs, scheduling information of the bundled RVs and a maximum number of bundled RVs; and
receive the ACK from the UE, wherein the ACK corresponds to a data packet decoded using one or more RVs among the RVs and the bundled RVs,
wherein the scheduling information of the bundled RVs comprises:
an indication of a sub-frame that includes the bundled RVs, where the bundled RVs are transmitted in consecutive sub-frames following the sub-frame in which a regular RV transmission is sent to the UE or in non-consecutive sub-frames.

16. The apparatus of claim 13, wherein the processor is further configured to control to:
suspend the HARQ process and start a suspension timer, if the channel occupancy period is over and the ACK for the HARQ process is not received,
wherein the RVs corresponding to the HARQ process are discarded if the suspension timer is expired, and the HARQ process is terminated.

17. The apparatus of claim 16, wherein the processor is further configured to control to:
discard at least one RV stored in HARQ buffers of the HARQ process if the suspension timer is expired;
retain a media access control (MAC) protocol data unit (PDU) corresponding to the HARQ process; and
initiate another HARQ process for the retained MAC PDU on the unlicensed channel.

18. The apparatus of claim 16, wherein the processor is further configured to control to:
enable a multi-carrier HARQ timer when a multi-carrier enabling indication is received;
discard at least one RV stored in HARQ buffers of the HARQ process in response to the HARQ process not being completed within a duration of the multi-carrier HARQ timer;
start a suspension timer if the multi-carrier HARQ timer is expired in the channel occupancy period; and
receive a feedback from the UE based on RVs provided via a multi-carrier HARQ packet or a single carrier HARQ packet.

19. The apparatus of claim 16, wherein the processor is further configured to control to:
retain a media access control (MAC) protocol data unit (PDU) corresponding to the HARQ process and HARQ buffers of the HARQ process, in response to the suspension timer being expired; and transmit remaining RVs for the HARQ process on the unlicensed channel or a licensed channel.

20. The apparatus of claim 13, wherein the processor is further configured to control to:
transmit subsequent RVs on a second carrier if the HARQ process is not completed in the channel occupancy period, wherein the second carrier is one of a licensed channel or the unlicensed channel.

21. The apparatus of claim 20, wherein a resource allocation signaling for the second carrier indicates a previous carrier on which a preceding RV was transmitted along with an associated HARQ process number corresponding to the preceding RV, where a new field is added to a multicarrier HARQ index to indicate the previous carrier on which the preceding RV of the associated HARQ process was transmitted.

22. The apparatus of claim 21, wherein the processor is further configured to control to:
define a format for a physical downlink control channel (PDCCH) to indicate the channel for which a resource allocation is intended for a cross-carrier scheduling and a channel on which a last RV was transmitted and the associated HARQ process number,
wherein the PDCCH is adapted to provide a bundling enabled indication if the bundling is enabled and a bundling frame indication to indicate occurrence of bundling in a sub-frame set in an indicated bit mask.

* * * * *